(12) United States Patent
Kanbara

(10) Patent No.: US 8,963,425 B2
(45) Date of Patent: Feb. 24, 2015

(54) POWER SUPPLY DEVICE, LAMP FITTING, AND VEHICLE

(75) Inventor: Takashi Kanbara, Ikeda (JP)

(73) Assignee: Panasonic Corporation, Osaka (JP)

(*) Notice: Subject to any disclaimer, the term of this patent is extended or adjusted under 35 U.S.C. 154(b) by 1084 days.

(21) Appl. No.: 12/993,573

(22) PCT Filed: May 25, 2009

(86) PCT No.: PCT/JP2009/059497
§ 371 (c)(1),
(2), (4) Date: Nov. 19, 2010

(87) PCT Pub. No.: WO2009/145128
PCT Pub. Date: Dec. 3, 2009

(65) Prior Publication Data
US 2011/0062870 A1 Mar. 17, 2011

(30) Foreign Application Priority Data
May 26, 2008 (JP) .................... 2008-136642

(51) Int. Cl.
H05B 37/02 (2006.01)
H02M 3/335 (2006.01)
H05B 33/08 (2006.01)

(52) U.S. Cl.
CPC ....... H02M 3/33507 (2013.01); H05B 33/0815 (2013.01)
USPC .......................... 315/77; 315/291; 315/209 R

(58) Field of Classification Search
CPC ............. H05B 33/0818; H05B 33/803; H05B 33/818; H05B 33/0848; H05B 33/0866; H05B 33/0887; H05B 37/02
USPC ......... 315/291, 307, 308, 294, 77, 76, 209 R, 315/312
See application file for complete search history.

(56) References Cited

U.S. PATENT DOCUMENTS 4,688,158 A * 8/1987 Peterson et al. ........... 363/21.18
6,188,184 B1 2/2001 Eberson et al.
(Continued)

FOREIGN PATENT DOCUMENTS

CN 1444430 9/2003
DE 10026070 12/2000
(Continued)

OTHER PUBLICATIONS

Corrected English language translation of Japan Office Action dated Oct. 22, 2013.
(Continued)

*Primary Examiner* — Douglas W Owens
*Assistant Examiner* — Amy Yang
(74) *Attorney, Agent, or Firm* — Greenblum & Bernstein, P.L.C.

(57) ABSTRACT

Provided is a power supply device, which is capable of coping with semiconductor light source loads to be set in various ways, and has high efficiency, in which a current to be supplied to each of the loads has a small ripple. The power supply device supplies power to a semiconductor light source load and lights the semiconductor light source load, and includes: a DC-DC converter; and a controller. The DC-DC converter includes an inductance element and a switching element, and performs voltage conversion by storing energy in the inductance element from an input power source when the switching element is on, and discharging the energy, the energy being stored in the inductance element, to a load side when the switching element is off. The controller controls ON/OFF operations of the switching element so that an output current of the DC-DC converter can be the same as a target value. In the power supply device, means for regulating timing of turning on the switching element so that a current flowing through the inductance element can flow in a continuous mode operation is provided at least in the controller.

14 Claims, 13 Drawing Sheets

(56) References Cited

U.S. PATENT DOCUMENTS

| | | |
|---|---|---|
| 6,288,501 B1 | 9/2001 | Nakamura et al. |
| 6,304,464 B1 * | 10/2001 | Jacobs et al. ............... 363/21.12 |
| 6,768,275 B2 | 7/2004 | Ito et al. |
| 6,798,671 B1 * | 9/2004 | Sakai ............................. 363/19 |
| 6,826,063 B2 | 11/2004 | Ichikawa et al. |
| 6,891,333 B2 | 5/2005 | Tatsukawa et al. |
| 6,951,416 B2 | 10/2005 | Sazuka et al. |
| 6,975,070 B2 * | 12/2005 | Namba et al. .................. 315/77 |
| 7,271,544 B2 | 9/2007 | Ichikawa et al. |
| 8,278,846 B2 | 10/2012 | Roberts et al. |
| 2003/0214251 A1 | 11/2003 | Ichikawa et al. |
| 2005/0189822 A1 | 9/2005 | Namba et al. |
| 2006/0028148 A1 | 2/2006 | Ichikawa et al. |
| 2006/0267516 A1 | 11/2006 | Konopka et al. |
| 2007/0115228 A1 | 5/2007 | Roberts et al. |

FOREIGN PATENT DOCUMENTS

| | | |
|---|---|---|
| DE | 10230103 A1 | 1/2004 |
| EP | 1046324 | 10/2000 |
| JP | 63-501400 | 5/1988 |
| JP | 2000-340384 | 12/2000 |
| JP | 2001-161066 | 6/2001 |
| JP | 2002-159175 | 5/2002 |
| JP | 2002-159176 | 5/2002 |
| JP | 2002-528884 | 9/2002 |
| JP | 2002-330585 | 11/2002 |
| JP | 2003-504828 | 2/2003 |
| JP | 2003-259641 | 9/2003 |
| JP | 2004-095479 | 3/2004 |
| JP | 2004-095480 | 3/2004 |
| JP | 2004-266928 | 9/2004 |
| JP | 2005-224087 | 8/2005 |
| JP | 2005-245152 | 9/2005 |
| JP | 2006-049127 | 2/2006 |
| JP | 2006-157988 | 6/2006 |
| JP | 2006-228687 | 8/2006 |
| JP | 2006-351685 | 12/2006 |
| JP | 2008-235530 | 10/2008 |
| WO | 01/05193 | 1/2001 |
| WO | 2004-006629 | 1/2004 |
| WO | 2007-061811 | 5/2007 |
| WO | 2007/061811 | 5/2007 |

OTHER PUBLICATIONS

Japan Office action, dated Oct. 22, 2013 along with an english translation thereof.

Japanese Office Action, mail date Jul. 31, 2012, and an English language translation thereof.

Chinese Office Action dated Dec. 3, 2012 and an English language translation thereof.

German Office Action, dated Nov. 10, 2014, along with English language translation.

* cited by examiner

FIG. 13
CURRENT OF
TRANSFORMER T1
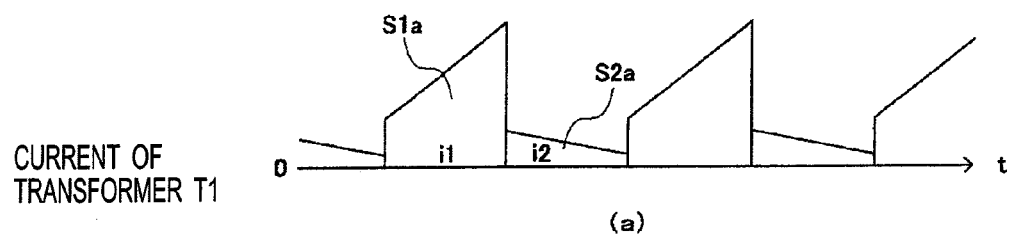
(a)
CURRENT OF
TRANSFORMER T1
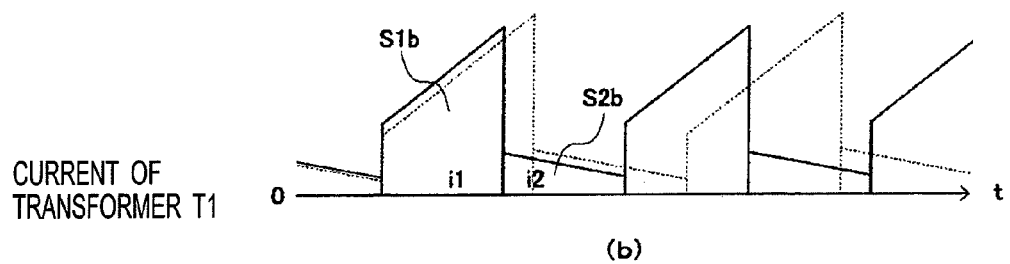
(b)

POWER SUPPLY DEVICE, LAMP FITTING, AND VEHICLE

TECHNICAL FIELD

The present invention relates to a power supply device using a DC-DC converter, and particularly, relates to a power supply device that supplies power to a semiconductor light source as a load, which is composed of a semiconductor light-emitting element such as a light-emitting diode (LED). Moreover, the present invention relates to a lamp fitting for a headlamp and the like, which uses the power supply device, and to a vehicle including the lamp fitting.

BACKGROUND ART

In recent years, a power supply device and a lamp fitting have been actively developed, which use, as a light source, a semiconductor light-emitting element such as a light-emitting diode (LED) in place of a halogen lamp and a discharge lamp. As performance such as light emission efficiency of the LED has been enhanced, these types of the power supply device and the lamp fitting have been expanded to be used not only for a room lamp and a rear combination lamp for a vehicle but also for a headlamp for the vehicle. A light source such as the halogen lamp and the discharge lamp (HID lamp), which has been heretofore used as a light source for the headlamp, is standardized, and a shape, characteristics, and the like thereof are determined. As opposed to this, under the present circumstances, the light source using the LED is not standardized, and at least for the present, a variety of the LEDs and combinations thereof will be set in response to specifications of the headlamp (Patent Literature 1, Patent Literature 2).

Moreover, in a DC-DC converter as a circuit for lighting such an LED load, there has been proposed a control method for turning on and off a switching element so that a current flowing through an inductance element that composes the DC-DC converter can flow in a critical mode (also referred to as a current boundary mode and the like) (Patent Literature 3). To drive the DC-DC converter in the current boundary mode is such a control method that has been examined and implemented in various ways for the conventional HID lamp. It is conceived that a loss can be reduced by using this control method also for the LED.

Incidentally, the semiconductor light source such as the LED is a low-impedance load having a predetermined forward voltage. Therefore, the load such as the semiconductor light source has characteristics that a large current ripple is prone to occur in the current flowing therethrough even if a voltage to be supplied thereto only has a small ripple component. This matter also results in that a current having a large ripple component flows through a wire connected to the load, also leading to an occurrence of unnecessary radiation noise. Accordingly, measures against noise are required.

CITATION LIST

Patent Literature

Patent Literature 1: Japanese Patent Laid-Open Publication No. 2004-095479.
Patent Literature 2: Japanese Patent Laid-Open Publication No. 2004-095480.
Patent Literature 3: Japanese Patent Laid-Open Publication No. 2003-504828.

SUMMARY OF INVENTION

Technical Problem

The present invention has been made in consideration of the foregoing point. It is an object of the present invention to provide a power supply device, which is capable of coping with semiconductor light source loads to be set in various ways, and has high efficiency, in which a current to be supplied to each of the loads has a small ripple.

Solution to Problem

In order to achieve the foregoing object, in an invention of claim 1, as illustrated in FIG. 1 and FIG. 2, a power supply device that supplies power to a semiconductor light source load 2 includes a DC-DC converter 1 and a controller. Here, the DC-DC converter 1 includes an inductance element T1 and a switching element Q1. The DC-DC converter 1 performs voltage conversion by storing energy in the inductance element T1 from an input power source E when the switching element Q1 is on, and discharging the energy, which is stored in the inductance element T1, to a load 2 side when the switching element Q1 is off. Moreover, the controller controls ON/OFF operations of the switching element Q1 so that an output current Io of the DC-DC converter 1 can be the same as a target value. Then, the power supply device includes means 8 for regulating timing of turning on the switching element Q1, which is provided at least in the controller, so that a current flowing through the inductance element can flow in a continuous mode operation.

In an invention of claim 2 according to the invention of claim 1, as illustrated in FIG. 2, the means 8 for regulating timing of turning on the switching element Q1 detects a current i2 flowing when the energy is discharged from the inductance element T1 to the load side when the switching element Q1 is off. Then, the means 8 is composed to turn on the switching element Q1 when a value of the detected current becomes equal to or lower than a predetermined value.

In an invention of claim 3 according to the invention of claim 2, a time while the switching element Q1 is off is controlled to continue for at least a first predetermined time or more, and not to go beyond a second predetermined time.

In an invention of claim 4 according to the invention of claim 1, the DC-DC converter 1 is composed of a flyback converter.

In an invention of claim 5 according to the invention of claim 1, the means for regulating timing of turning on the switching element Q1 is composed of a drive frequency setter 81 that determines a frequency for driving the switching element Q1 (FIG. 5).

In an invention of claim 6 according to the invention of claim 5, the frequency for driving the switching element Q1 is determined based on at least a value of the output current of the DC-DC converter (FIG. 5).

In an invention of claim 7 according to the invention of claim 5, as illustrated in FIG. 7, the DC-DC converter is composed of a flyback converter. When an input voltage is Vi, the output voltage is Vo, the target value of the output current is Io, a turns ratio between a primary side and secondary side of a transformer T1 that composes the flyback converter is N, an inductance value on the primary side is L1, and the frequency for driving the switching element Q1 is f, the controller determines the frequency for driving the switching element Q1 so as to satisfy a condition (Step #9) that is: $f > 1/(2 \cdot L1 \cdot Io \cdot Vo) \cdot (Vi \cdot Vo/(N \cdot Vi + Vo))^2$.

In an invention of claim 8 according to the invention of claim 7, as illustrated in FIGS. 8(a) to 8(c), the controller determines the frequency for driving the switching element Q1 so as to satisfy a condition (Step #9) that is: $f \geq k/(2 \cdot L1 \cdot Io \cdot Vo) \cdot (Vi \cdot Vo/(N \cdot Vi + Vo))^2$ in a case where a constant is k. Then, a value of the constant k is at least a value of 1.05 or more.

In an invention of claim 9 according to the invention of claim 5, the frequency for driving the switching element Q1 is determined by assuming a case where a voltage value Vi is the highest within a voltage range where the input power source E of the DC-DC converter is usually used (refer to Steps #2 and #9 in FIG. 12).

In an invention of claim 10 according to the invention of claim 5, a value of the frequency for driving the switching element Q1 is controlled to be at least a first predetermined frequency or higher, and a second predetermined frequency or lower (refer to Steps #13 and #14 in FIG. 12).

In an invention of claim 11 according to the invention of claim 5, as the frequency for driving the switching element Q1, a value set when a circuit operation is started is used for a period until the circuit operation is stopped (control by a flag FS in FIG. 14).

In an invention of claim 12 according to the invention of claim 5, a value preset in the power supply device is used as the frequency for driving the switching element Q1 (Step #4 in FIGS. 8, 12, and 14, and the like).

In an invention of claim 13 according to the invention of claim 1, a configuration is adopted so that the target value Io* of the output current Io can be set from an outside of the power supply device (refer to output current target value storage/adjustment units 51 in FIGS. 7 and 11, and Steps S1 to S3 in FIG. 8).

In an invention of claim 14 according to the invention of claim 1, a value preset in the power supply device is used as the target value Io* of the output current Io (refer to output current target value setters 5 in FIGS. 1 and 5).

An invention of claim 15 is a lamp fitting that mounts thereon the power supply device 95 according to any one of claims 1 to 14 (FIG. 15).

An invention of claim 16 is a vehicle 100 that mounts thereon the lamp fitting according to claim 15 (FIG. 16).

Advantageous Effects of Invention

In accordance with the present invention, it becomes possible to provide the power supply device, which is capable of coping with the semiconductor light source loads to be set in various ways, and has high efficiency, in which the current to be supplied to each of the loads has a small ripple. Moreover, it becomes possible to provide a system, which is more functional and inexpensive, in such a manner that the power supply device of the present invention is used for the lamp fitting for the vehicle.

BRIEF DESCRIPTION OF THE DRAWINGS

FIGS. 13(a) and 13(b) are operation waveform charts of Embodiment 6 of the present invention.

DESCRIPTION OF EMBODIMENTS

Basic Configuration

Figure 1:
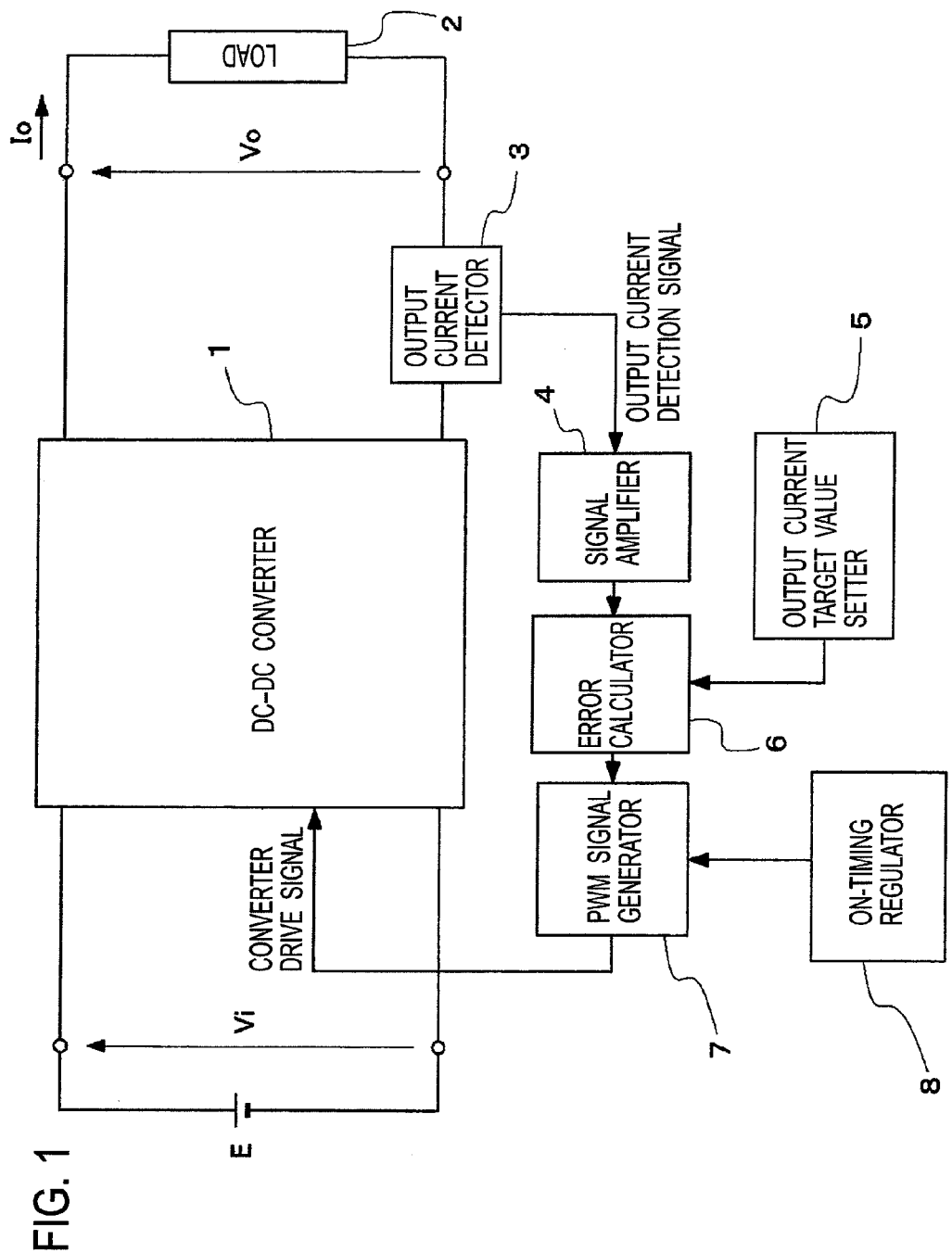
FIG. 1 is a basic configuration diagram of embodiments of the present invention.

A basic configuration diagram of the present invention is illustrated in FIG. 1. By using FIG. 1, a description is made below of a basic configuration of the present invention. A DC-DC converter 1 receives an input from a DC power source E, and gives a load 2 an output formed by performing voltage conversion for the input. Specifically, the DC-DC converter 1 includes an inductance element and a switching element. The DC-DC converter 1 stores energy in the inductance element from the power source when the switching element is on, and discharges the energy, which is stored in the inductance element, to the load side when the switching element is off. In such a way, the DC-DC converter 1 supplies the output, which is subjected to the voltage conversion, to the load side. Specifically, the DC-DC converter 1 is a flyback converter, a buck-boost converter, a boost converter, or the like, and preferably, is composed of the flyback converter capable of appropriately setting such a conversion voltage for the load.

Moreover, the DC-DC converter 1 is subjected to output current control by the following configuration. A current to be outputted from the DC-DC converter 1 is detected as an output current detection signal by a current detector 3, and the output current detection signal is amplified by a signal amplifier 4. Thereafter, for the amplified output current detection signal, an error thereof with respect to a target value of an output current, which is to be given from an output current target value setter 5, is obtained by an error calculator 6. Upon receiving an output from the error calculator 6, a PWM signal generator 7 outputs a converter drive signal for driving the DC-DC converter 1. The switching element of the DC-DC converter 1 is operated to turn on and off by the converter drive signal. In such a way, feedback control is performed, whereby the output current of the DC-DC converter 1 becomes the target value.

A feature of the power supply device of the present invention is that an ON-timing regulator 8 is provided in addition to the above-described configuration for the output current control. In order that a current flowing through the inductance element of the DC-DC converter 1 can flow in a continuous mode operation, the ON-timing regulator 8 regulates timing of turning on the switching element, and gives a signal to the PWM signal generator 7. Upon receiving this signal, the PWM signal generator 7 creates a PWM signal for driving the DC-DC converter 1, and outputs the created PWM signal as the converter drive signal.

In such a way, an output current control operation is performed while maintaining the current, which flows through the inductance element of the DC-DC converter 1, in such a continuous mode. Therefore, it becomes possible to provide the power supply device, which is capable of coping with the semiconductor light source loads to be set in various ways, and has high efficiency, in which the current to be supplied to the load 2 has a small ripple.

Embodiment 1

Figure 2:
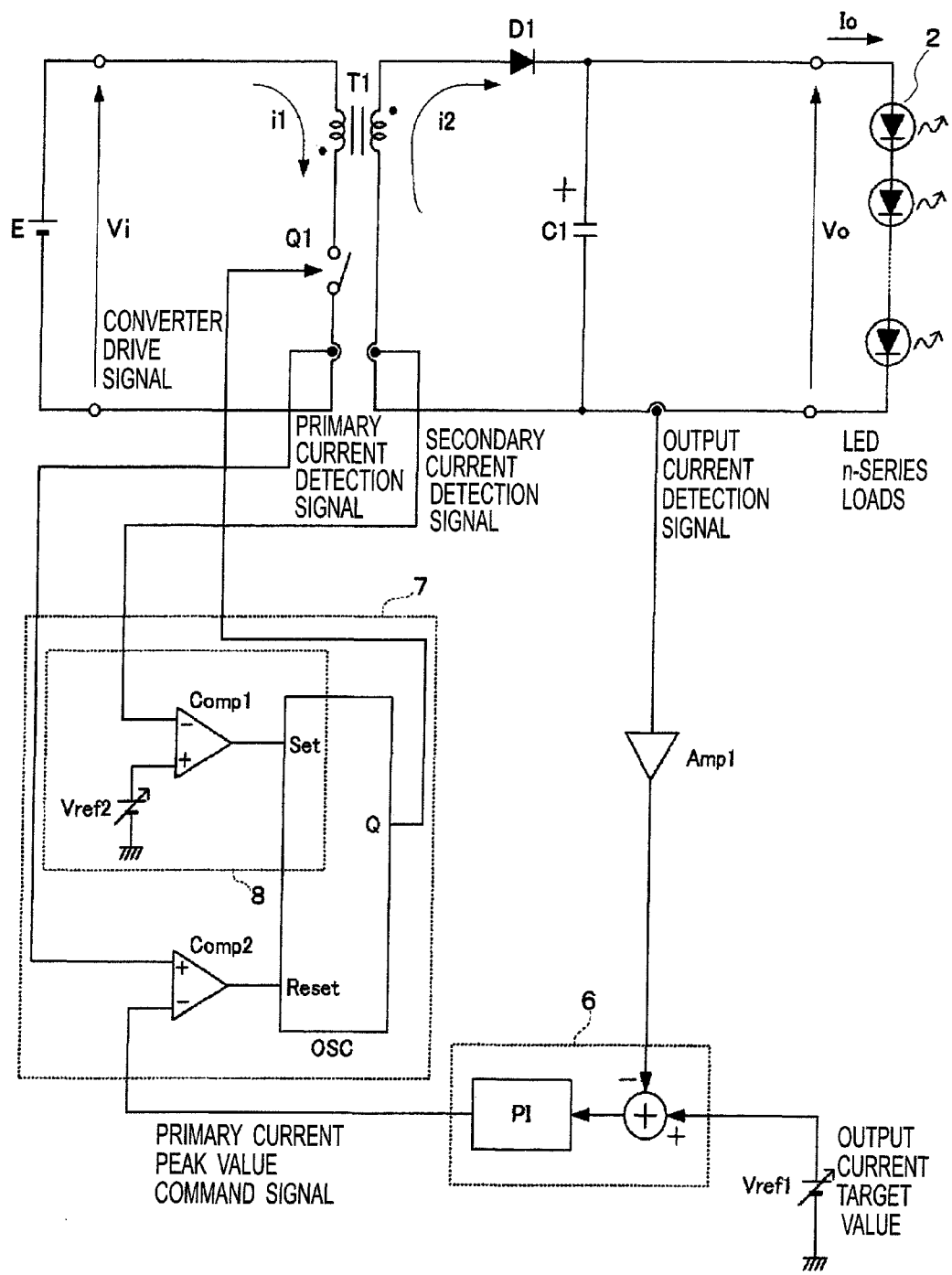
FIG. 2 is a circuit diagram of Embodiment 1 of the present invention.
Figure 3:
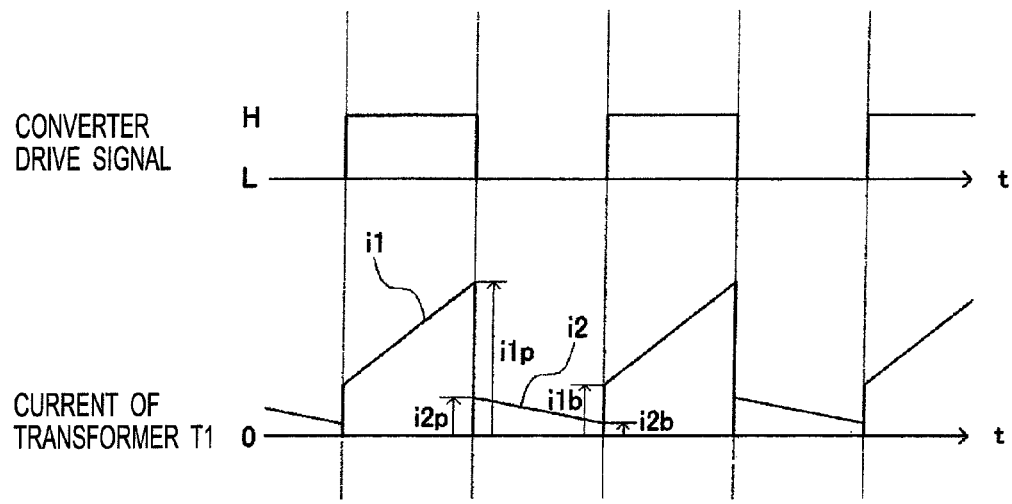
FIG. 3 is an operation waveform chart of Embodiment 1 of the present invention.

A circuit diagram of Embodiment 1 of the present invention is illustrated in FIG. 2, and an operation waveform chart thereof is illustrated in FIG. 3. By using FIGS. 2 and 3, a description is made of a specific content of this embodiment.

In this embodiment, the DC-DC converter is a flyback-type converter including a transformer T1, a switching element Q1, a rectifying diode D1, and a smoothing capacitor C1. A load 2 to be connected to the DC-DC converter is an LED load in which a plurality of LED elements are connected in series to one another.

A description is made of basic operations of the DC-DC converter. When the switching element Q1 is on, a current i1 flows from the power source E through a primary side of the transformer T1, and energy is stored in the transformer T1. Then, when the switching element Q1 turns off, the energy stored in the transformer T1 is discharged as a current i2 from a secondary side of the transformer T1 through the diode D1 to the capacitor C1. In such a way, voltage conversion is performed, and power is supplied to the load side.

FIG. 3 is an example of waveforms in the case of operating the DC-DC converter so that the current flowing through the transformer T1 thereof can be continuous. An inductance of the primary side of the transformer T1 is L1, an inductance of the secondary side of the transformer T1 is L2, a turns ratio between the primary side and the secondary side is N, an input voltage is Vi, and an output voltage is Vo. A gradient of the current i1 flowing when the switching element Q1 is on becomes Vi/L1, and a gradient of the current i2 flowing when the switching element Q1 is off becomes −Vo/L2.

Here, the inductance values L1 and L2 of the primary and secondary sides of the transformer T1 have a relationship of $L2=N2 \cdot L1$. With regard to a peak value $i1p$ of the current i1 and a peak value $i2p$ of the current i2, which are illustrated in FIG. 3, the peak value $i2p$ becomes 1/N times the peak value i1 in terms of a relationship therebetween, and with regard to $i2b$ and $i1b$ as base components of the currents at the time of a continuous mode operation, $i1b$ becomes N times $i2b$ in terms of a relationship therebetween.

In the case where both of the input and output voltages are completely smoothed, an average value of the current i1 becomes an input current and an average value of the current i2 becomes an output current. Moreover, in the case of assuming an ideal state where there is no circuit loss, a value of an input power and the value of the output power become equal to each other. Therefore, with regard to the input current, which is specifically the average value of the current i1, and the output current, which is specifically the average value of the current i2, the input current becomes (input voltage Vi/output voltage Vo) times the output current in terms of a relationship therebetween.

Incidentally, it is an operation of a current boundary mode that the DC-DC converter is driven so that the values $i2b$ and $i1b$ of the base components of the currents can become zero, and in the above-mentioned conventional example, it is proposed that the DC-DC converter is operated in this way. Specifically, in the current boundary mode, at the point of time when the current i2 becomes zero, the switching element Q1 is turned on one more time, whereby such an operation in a state where there are no base components of the currents is realized.

However, in the case of operating the DC-DC converter in the current boundary mode, and in the case of taking a specific load as a subject, if constants of the transformer T1 and the like are set in response to values of a voltage and current of the load concerned based on the above-mentioned respective relationships, then the switching element Q1 can be driven at an assumed frequency. However, in the case where the DC-DC converter is attempted to cope with such variously set loads among which voltages and currents are different from one another, such problems occur, depending on the loads to be connected thereto, that the peak values of the respective currents become too large and the frequency gets lowered to a great extent owing to the fact that the point of time when the current i2 becomes zero is awaited.

As opposed to this, in the present invention, the switching element Q1 is controlled so as to turn on one more time before the current i2 becomes zero, that is, at the point of time when the current i2 has a predetermined base component $i2b$. In such a way, the above-described problems are solved, thus making it possible to cope with the variously set loads.

In this embodiment, this is realized by the following configuration (FIG. 2). A primary current detection signal, a secondary current detection signal, and an output current detection signal are obtained by the detector composed of a resistor and the like. The PWM signal generator 7 includes: an oscillator OSC including a set-reset flip-flop; a comparator Comp1 that gives a signal to a set input Set of the oscillator OSC; a comparator Comp2 that gives a signal to a reset input Reset thereof; and the like.

A reference voltage Vref2 of the PWM signal generator 7 is one to give a voltage for comparison to the comparator Comp1, and the comparator Comp1 compares a value of the reference voltage Vref2 and a value of the secondary current detection signal with each other. When the value of the secondary current detection signal is equal to or lower than the reference voltage Vref2, an output of the comparator Comp1 turns to a High level, and an output Q of the oscillator OSC turns to the High level. In such a way, the switching element Q1 turns on, the current i2 becomes zero, and the current i1 flows.

The output current detection signal is amplified by an amplifier Amp1, and the amplified signal is inputted to the error calculator 6. The error between the signal thus inputted and the reference voltage Vref1 as the target value of the output current is calculated and amplified (defined to be a proportional-integral as PI in FIG. 2) in the error calculator 6. Then, a result thus obtained is given as a primary current peak value command signal to the comparator Comp2. The comparator Comp2 compares a value of this primary current peak value command signal and a value of the primary current detection signal with each other. When the value of the primary current detection signal becomes equal to or higher than the value of the primary current peak value command signal, the comparator Comp2 gives a High-level signal to the reset input Reset of the oscillator OSC, and the output Q of the oscillator OSC turns to the low level. In such a way, the switching element Q1 turns off, the current i1 becomes zero, and the current i2 flows.

With the configuration described above, the switching element Q1 is driven by the converter drive signal so that an output current Io of the power supply device can be the same as the target value set by the reference voltage Vref1, and the control of the output current is realized.

In this embodiment, the comparator Comp1 and the reference voltage Vref2, which compose the PWM signal generator 7, are composed so as to also serve as the ON-timing regulator 8, and enable the value of the reference voltage Vref2 to regulate the timing of turning on the switching element Q1. Specifically, by the reference voltage Vref2, it can be arbitrarily determined at which point of time since the current i2 is lowered the switching element Q1 is to be turned on one more time. Here, the switching element Q1 is turned on when the current i2 reaches a certain value (corresponding to i2b in FIG. 3).

In accordance with this embodiment, in consideration of the case of coping with the variously set loads, there can be appropriately set not only the constants of the transformer T1 and the like but also the base components of the currents in the event of operating the DC-DC converter in the current continuous mode. Accordingly, it becomes possible to provide a power supply device capable of coping with these loads. Moreover, in comparison with the conventional examples, the peak values of the respective currents do not become too large, and the frequency does not get lowered to a great extent. Therefore, it becomes possible to supply a stable output that has a small ripple and is always efficient for the variously set loads.

Embodiment 2

Figure 4:
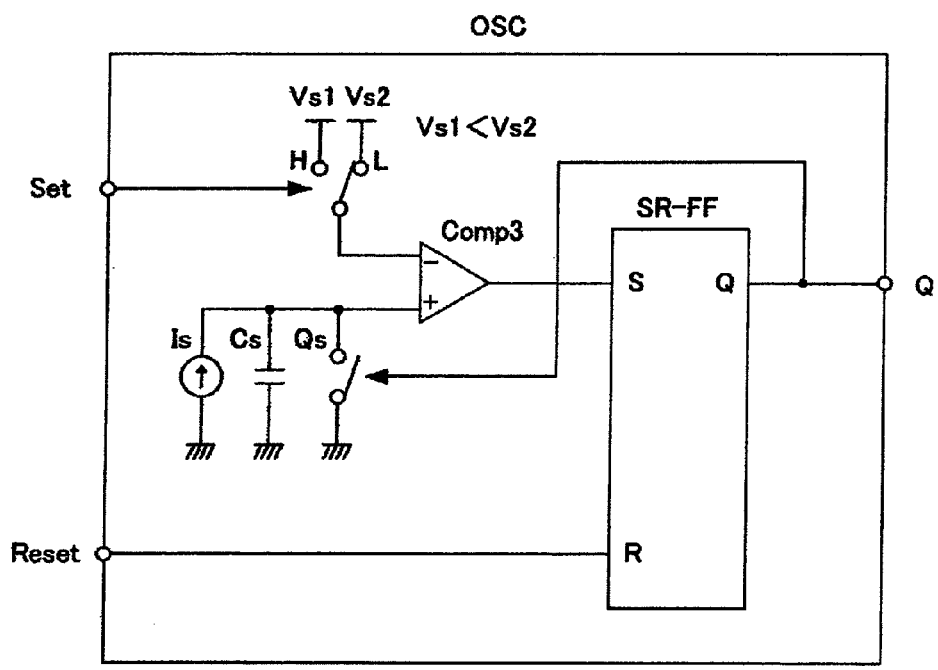
FIG. 4 is a main portion circuit diagram of Embodiment 2 of the present invention.

A main portion circuit diagram of Embodiment 2 of the present invention is illustrated in FIG. 4. In this embodiment, a comparator Comp3 and a peripheral circuit thereof are provided to the oscillator OSC in the circuit diagram (FIG. 2) illustrated in the above-mentioned embodiment. In such a way, it becomes possible to set an upper limit and a lower limit to a time while the output Q of the oscillator is turning to the Low level, that is, a time while the switching element Q1 is in the OFF-state.

To a noninverting input terminal of the comparator Comp3, a parallel circuit of a current source Is, a capacitor Cs, and a switch element Qs is connected. Here, the current source Is and the capacitor Cs compose a timer, and the switch element Qs discharges electric charges of the capacitor Cs to reset the electric charges to zero. The switch element Qs is driven by the output Q of the set-reset flip-flop SR-FF. Meanwhile, for an inverting input terminal of the comparator Comp3, there are provided reference voltages Vs1 and Vs2 and a switching switch for selecting the reference voltages Vs1 and Vs2 based on a state of a signal of the set input Set of the oscillator OSC (here, there is a relationship of Vs1<Vs2).

With the configuration described above, even if the High-level signal is inputted to the set input Set of the oscillator OSC, an output of the comparator Comp 3 does not turn to the High level for a time until a value of a voltage generated in the capacitor Cs reaches a value of the reference voltage Vs1 or more. Therefore, the output Q of the oscillator OSC maintains the Low level, and the switching element Q1 also maintains the OFF-state.

Moreover, on the contrary, even in the case where the Low-level signal is inputted to the set input Set of the oscillator OSC (as in an illustrated state), the output of the comparator Comp3 turns to the High level at the point of time when the value of the voltage generated in the capacitor Cs reaches a value of the reference voltage Vs2 or higher. Therefore, the output Q of the oscillator OSC turns to the High level, and the switching element Q1 also turns on.

In accordance with this embodiment, the upper limit and the lower limit are set for the time while the switching element Q1 is turning off in such a manner as described above. In such a way, it becomes possible to perform control so that the OFF-state of the switching element Q1 can continue at least for a predetermined time to be set by the reference voltage Vs1 or more, and cannot go beyond a predetermined time to be set by the reference voltage Vs2. Specifically, the maximum value and minimum value of an OFF-time of the switching element Q1 can be set. Therefore, in comparison with the above-mentioned embodiment, it becomes possible to provide a power supply device capable of surely coping with loads having wider characteristic ranges.

Embodiment 3

Figure 5:
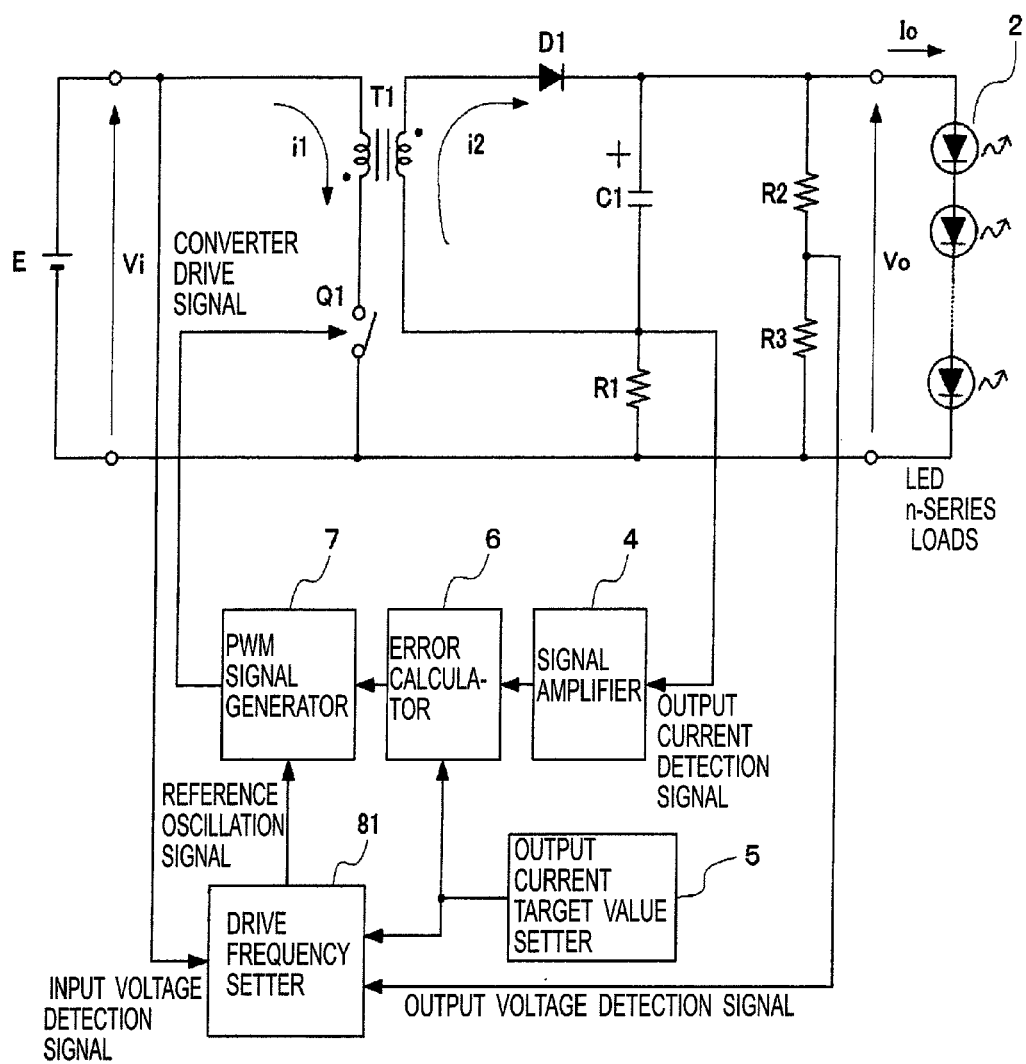
FIG. 5 is a circuit diagram of Embodiment 3 of the present invention.

A circuit diagram of Embodiment 3 of the present invention is illustrated in FIG. 5. This embodiment is different from the above-described embodiments in being composed by providing, as means for regulating the timing of turning on the switching element Q1, a drive frequency setter 81 that sets a frequency of driving the switching element Q1 in place of the ON-timing regulator 8 of Embodiment 1.

To the drive frequency setter 81, there are inputted: an input voltage detection signal; an output voltage detection signal; and the target current value to be given from the output current target value setter 5. Based on these signals and value, the drive frequency setter 81 sets the drive frequency of the converter drive signal. The set drive frequency is given as a reference oscillation signal to the PWM signal generator 7. Based on the reference oscillation signal thus given, the PWM signal generator 7 creates the converter drive signal that regulates the timing of turning on the switching element Q1, and drives the switching element Q1 by using the converter drive signal concerned.

This embodiment is configured so that the output current Io can be detected by a resistor R1, and that the output voltage Vo can be detected by resistors R2 and R3.

In the drive frequency setter 81, the reference oscillation signal is determined so that the current flowing through the inductance element (the transformer T1 in this embodiment) of the DC-DC converter can flow in the continuous mode. In such a way, it becomes possible to provide the power supply device, which is capable of coping with each of the variously set semiconductor light source loads 2, and has high efficiency, in which the current to be supplied to the load 2 has a small ripple.

FIGS. 6(a) to 6(d) are explanatory views of operation waveforms of Embodiment 3. The waveforms of FIGS. 6(a) and 6(b) are illustrated in order to be compared with the waveforms of FIGS. 6(c) and 6(d) according to the present invention, and to describe the effects of the present invention. As mentioned in the description of the conventional example, the waveforms of FIGS. 6(a) and 6(b) are waveforms created by assuming the case where the flyback converter is operated in the current boundary mode for the purpose of reducing the circuit loss.

As the load 2, an LED load is composed, for example, in such a manner that two LED light sources are connected in series to each other. Here, each of the LED light sources is formed in such a manner that four LED elements are connected in series to one another and are housed in one package. It is assumed that the current flowing through the transformer T1 becomes as illustrated in FIG. 6(a) in the case where the output current Io taken as a target current is supplied to the LED load.

A value obtained by averaging an area S2a of a waveform of the current i2 by a switching cycle at this time becomes equal to the output current Io (in the case where the output voltage Vo is assumed to be smoothed sufficiently and the output current Io is assumed to be constant).

Moreover, in the case where the DC-DC converter is assumed to be ideal and no loss is assumed to occur at the time of a conversion operation, a value obtained by multiplying the output voltage Vo and the value, which is obtained by averaging the area S2a by the switching cycle, becomes equal to a value obtained by multiplying the input voltage Vi and a value, which is obtained by averaging an area S1a of a waveform of the current i1 by the switching cycle (the respective values correspond to output power and input power).

Moreover, in the case where the turns ratio between the primary side and the secondary side in the transformer T1 is defined to be N, the peak value of the current i2 becomes 1/N times the peak value of the current i1 in terms of the relationship therebetween.

FIG. 6(b) illustrates a waveform in the case where the LED load is composed by connecting three LED light sources described above in series to one another and control is performed so that an output current for this LED load can be the same as the output current for the above-described LED load. The configuration of the load is changed from the serial connection of two LED light sources to a serial connection of three LED light sources, whereby the output voltage Vo becomes 3/2 times. Since the output current Io is the same, a relationship between the output power and the input power also becomes 3/2 times following such an increase of the output voltage.

At this time, an area S1b of the waveform of the current i1 becomes 3/2×(ratio of cycles) times the area S1a, and an area S2b of the waveform of the current i2 becomes (ratio of cycles) times the area S2a (values obtained by averaging the areas S1b and S2b by the switching cycle are an input current and output current thereof, respectively).

Moreover, the gradient of the current i2 becomes as steep as 3/2 times in such a manner that the output voltage Vo becomes 3/2 times.

In the case of changing the load to be connected to the power supply device as described above, the peak values of the current i1 and the current i2 rise largely. In an actual circuit, this matter leads to an increase of a switching loss, and causes an increase of a ripple voltage and an increase of a ripple current.

FIGS. 6(c) and 6(d) illustrate the operation waveforms in the case of using the present invention. In order to compare these operation waveforms with the waveforms in FIGS. 6(a) and 6(b) in the above-mentioned case where the DC-DC converter is operated in the conventional boundary mode, here, there are illustrated waveforms in the case where the reference oscillation signal is determined by the drive frequency setter 81 so that the switching frequencies of the respective waveforms can be the same thereamong (the inductance values L1 and L2 in the waveforms of FIGS. 6(c) and 6(d) are made larger than those in the waveforms of FIGS. 6(a) and 6(b), and others including the turns ratio of the transformer T1 are made the same thereamong).

Here, a period (ON-duty) while the switching element Q1 is turning on in one cycle is determined by the input voltage Vi, the output voltage Vo, and the turns ratio N of the transformer. As a result, the ON-duties of the waveforms in FIGS. 6(c) and 6(d) become the same as those of the waveforms FIGS. 6(a) and 6(b), respectively. Moreover, areas S1c and S2c become the same as the areas S1a and S2a, respectively, and areas S1d and S2d become the same as the areas S1b and S2b, respectively.

The waveforms in FIGS. 6(c) and 6(d) become waveforms in which there are base components in the currents i1 and i2 since the DC-DC converter is operated so that the current flowing through the transformer T1 can flow in the continuous mode by using the present invention.

When the waveforms in FIGS. 6(c) and 6(d) in the case where the assumed configurations of the LED loads are the serial connection of two LED light sources and the serial connection of three LED light sources are compared with the conventional waveforms in FIGS. 6(a) and 6(b), it is confirmed that the following features and effects are brought according to the waveforms in FIGS. 6(c) and 6(d).

In both of the currents i1 and i2, the current peak values thereof are reduced in comparison with those in the conventional waveforms. The peak values are lower though the areas are the same as in the conventional waveforms, and accordingly, effective values of the respective waveforms are lowered. As a result, effects of reducing the ripple current and the ripple voltage are brought (the effect of reducing the ripples is brought not only for the output but also for the input).

Moreover, with regard to efficiency of the DC-DC converter, as mentioned in the conventional example, it is obvious that the loss in the boundary mode operation becomes lower than in the discontinuous mode operation. However, in the case where the boundary mode operation and the continuous mode operation are compared with each other, it cannot be necessarily said that the efficiency of the boundary mode operation becomes higher than that of the continuous mode operation.

In the actual circuit, the loss in the whole of the DC-DC converter is determined by the respective losses, which are: switching losses which occur when the switching element Q1 turns on and off; a loss that occurs by the current flowing when the switching element Q1 is in the ON-state; losses which occur by the current flowing through the transformer 1 (copper loss and iron loss); a loss that occurs in the diode D1; and the like. When the waveforms in FIGS. 6(a) and 6(b) and the waveforms in FIGS. 6(c) and 6(d) are compared with each other, respectively, it is conceived that the switching loss when the switching element Q1 turns on is increased more in the continuous mode operation. On the contrary, it is conceived that the switching loss when the switching element Q1 turns off, the loss when the switching element Q1 is in the ON-state, and the like are rather reduced more in the continuous mode operation. When this is actually confirmed by an actual device, it is confirmed that the loss in the whole of the DC-DC converter is reduced more and conversion efficiency thereof is enhanced in the case where the DC-DC converter is allowed to perform the continuous mode operation.

As described above, in accordance with the present invention, the reference oscillation signal is determined by the drive frequency setter 81 so that the current flowing through the transformer T1 of the DC-DC converter can flow in the continuous mode. In such a way, it becomes possible to provide a power supply device, which is capable of coping with the variously set semiconductor light source loads, and has high efficiency, in which the current to be supplied to each of the loads has a small ripple, and eventually, noise occurring by the ripple component is also small. Moreover, in comparison with Embodiments 1 and 2, it becomes unnecessary to detect the current i2, and accordingly, there is an advantage that the circuit can be configured simply.

Incidentally, from the above-mentioned respective relationships and the like, it is derived that, in order to allow the DC-DC converter to perform the continuous mode operation, the frequency f just needs to be determined in the drive frequency setter 81 so as to satisfy the following relationship.

$$f > 1/(2 \cdot L1 \cdot Io \cdot Vo) \cdot (Vi \cdot Vo/(N \cdot Vi + Vo))^2$$

where L1 is the inductance value of the primary side of the transformer T1, N is the turns ratio between the primary side and the secondary side, Vi is the input voltage, Vo is the output voltage, and Io is the output current.

As mentioned in this embodiment, in order to set the same frequency as in the boundary mode operation, the frequency f just needs to be set in the following relational expression, and a coefficient k just needs to be set so as to obtain a desired frequency.

$$f = k/(2 \cdot L1 \cdot Io \cdot Vo) \cdot (Vi \cdot Vo/(N \cdot Vi + Vo))^2$$

(where k>1)

Incidentally, in order to appropriately provide the base component of the current at the time of the continuous operation, it is preferable to set a value of the coefficient k at least a value of 1.05 or more, and optimally, at a value of 1.1 or more. In such a way, it becomes possible to obtain the effects of the present invention more efficiently.

Embodiment 4

Figure 7:
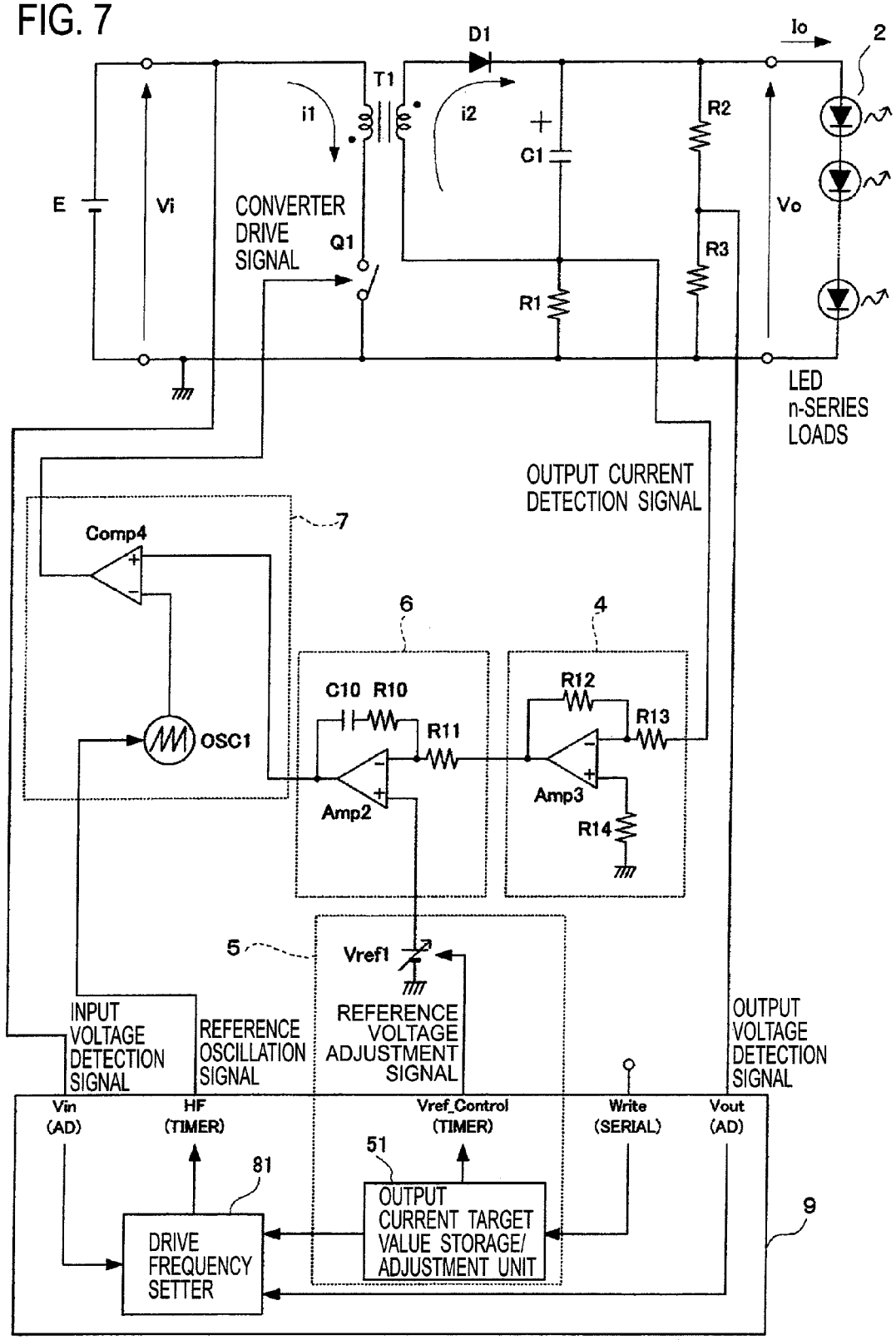
FIG. 7 is a circuit diagram of Embodiment 4 of the present invention.
Figure 8:
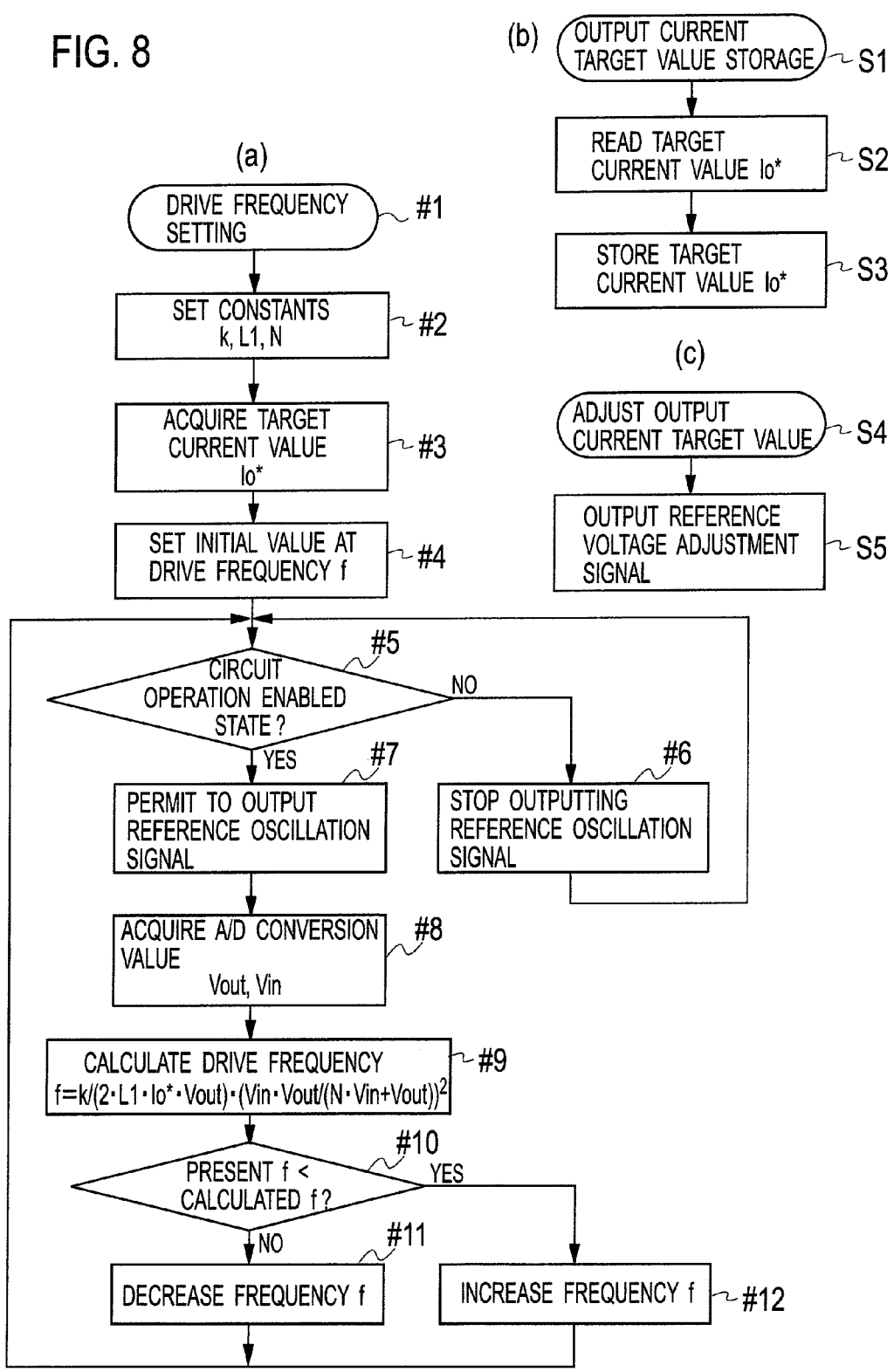
FIGS. 8(a) to 8(c) are operation explanatory charts of a microcomputer of Embodiment 4 of the present invention.

A circuit diagram of Embodiment 4 of the present invention is illustrated in FIG. 7. Moreover, operation explanatory charts of a microcomputer 9 of this embodiment of the present invention are illustrated in FIGS. 8(*a*) to 8(*c*). In this embodiment, a part of the controller is composed by using the microcomputer 9.

Basic operations of a power supply device in this embodiment are as follows. The current flowing through the load 2 is detected as the output current detection signal by the current detection resistor R1, and the signal concerned is amplified by the signal amplifier 4. Thereafter, the amplified signal is compared with the reference voltage Vref1 by the error calculator 6, and a result thereof is inputted as the PWM command signal to the PWM signal generator 7. The PWM signal generator 7 generates a predetermined PWM signal, and supplies the PWM signal as an ON/OFF control signal (converter drive signal) to the switching element Q1. In such a way, a feedback control system is composed so as to adjust the output current.

In this embodiment, the signal amplifier 4 is formed as an inverting amplifier composed of an operational amplifier Amp3; and resistors R12, R13, and R14 which are placed on the periphery thereof. The error calculator 6 is formed as a proportional-integrator composed of: an operational amplifier Amp2; and resistors R10 and R11 and a capacitor C10, which are placed on the periphery thereof.

From a TIMER port HF of the microcomputer 9, the reference oscillation signal for driving the DC-DC converter (signal with the same frequency as that of the converter drive signal serving as a base of creating the converter drive signal) is given, and the reference oscillation signal is inputted to a saw tooth wave generator OSC1. Upon receiving this reference oscillation signal, the saw tooth wave generator OSC1 generates a saw tooth wave that oscillates at the same frequency as that of the reference oscillation signal. The saw tooth wave generator OSC1 is composed so as to set such an output thereof at zero at rise-up timing of the reference oscillation signal.

A comparator Comp4 compares the signal, which comes from the saw tooth wave generator OSC1 and is inputted to an inverting input terminal thereof, with a value of the PWM command signal, which comes from the error calculator 6 and is inputted to a noninverting input terminal thereof. Then, the comparator Comp4 outputs a pulse signal, in which an ON-duty is determined based on a comparison result of the signals, at a frequency regulated by the saw tooth wave generator OSC1 (that is, regulated by the reference oscillation signal). Such an output of the comparator Comp4 is given as the converter drive signal to the DC-DC converter, and the switching element Q1 is driven to turn on and off.

With the configuration described above, the timing of turning on the switching element Q1 can be regulated by the drive frequency setter 81, and the DC-DC converter is driven at the frequency determined by the drive frequency setter 81.

Incidentally, the microcomputer 9 reads in a voltage, which is obtained by dividing the output voltage Vo of the DC-DC converter by the resistor R2 and the resistor R3, as an output voltage detection signal Vout from an A/D conversion port thereof. Moreover, the microcomputer 9 reads in the input voltage Vi as an input voltage detection signal Vin from the A/D conversion port in the same way. Furthermore, the target value of the output current, which is given by communication means from Write of a serial communication port, is stored by an output current target value storage/adjustment unit 51. The output current target value storage/adjustment unit 51 outputs a reference voltage adjustment signal Vref_Control from a second TIMER port so that the reference voltage Vref1 of the error calculator 6 can become a value corresponding to the target current value, and gives the target value of the output current to the drive frequency setter 81 composed of software. The drive frequency setter 81 sends out the reference oscillation signal HF from a first TIMER port to the PWM signal generator 7 based on the input voltage detection signal, the output voltage detection signal, and the target value of the output current.

Next, a description is made of operations of the microcomputer 9 by using FIGS. 8(*a*) to 8(*c*). First, the output current target value is set as mentioned above by using the communication means at an initial stage before the circuit operation is started. When processing for storing the output current target value in Step S1 (FIG. 8(*b*)) is executed, then in Step S2, the target value of the output current is read as Io* from the outside of the power supply device. Then, in Step S3, the read value is stored as the target current value Io* in an internal memory of the microcomputer 9 or an external memory installed on the outside of the microcomputer 9.

Next, processing for adjusting the output current target value in Step S4 (FIG. 8(*c*)) is executed. A signal for varying the reference voltage Vref1 of the error calculator 6 to a value corresponding to the target value Io* of the output current, which is stored at the time of the circuit operation, is outputted as the reference voltage adjustment signal Vref_Control from the second TIMER port of the microcomputer 9 in Step S5. In such a way, the reference voltage Vref1 of the error calculator 6 becomes the value corresponding to the output current target value Io*.

Figure 9:
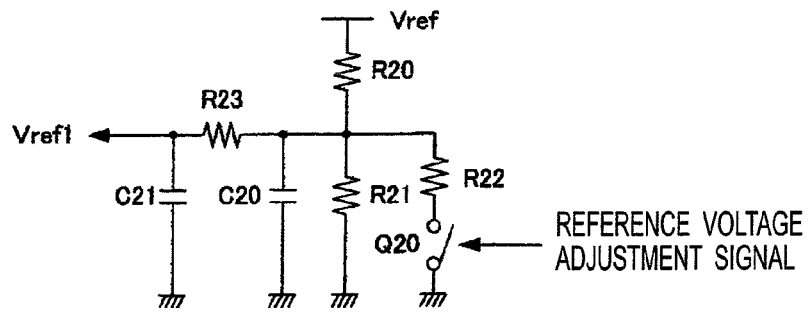
FIG. 9 is a circuit diagram of a reference voltage variable circuit for use in Embodiment 4 of the present invention.

Here, an example of a specific circuit configuration for varying the reference voltage Vref1 is illustrated in FIG. 9. The reference voltage adjustment signal Vref_Control is given as a signal that turns on and off at a high frequency from the second TIMER port of the microcomputer. A reference voltage Vref in FIG. 9 is a stable voltage for the control, which is created by a separate circuit. When the case where a switching element Q20 is always off is considered, a voltage to be outputted as the reference voltage Vref1 in this case becomes a value obtained by dividing the reference voltage Vref by a resistor R20 and a resistor R21 (this value is defined to be Vref1_max). Moreover, on the contrary, when the case where the switching element Q20 is always on is considered, a voltage to be outputted as the reference voltage Vref1 becomes a value obtained by dividing the reference voltage Vref by the resistor R20 and combined resistance of the resistor R21 and a resistor R22, which are connected in parallel to each other (this value is defined to be Vref1_min) In the case where the switching element Q20 is operated to turn on and off at a constant frequency, the value to be outputted as the reference voltage Vref1 can be set at a value between the above-described values Vref1_max and Vref1_min by the ON-duty thereof.

Other constituents of this circuit, which are a resistor R23, a capacitor C21, and the like, are provided as a filter, whereby the reference voltage Vref1 is stabilized. By the way, in order to vary the reference voltage Vref1 of the error calculator 6, a configuration may also be adopted, in which the reference voltage Vref1 is directly given by using an analog input of a D/A conversion port in the case of a microcomputer having a D/A conversion function. Moreover, for such a method, as in this example, a D/A converter may be substantially composed of an ON/OFF signal (reference voltage adjustment signal) from the microcomputer 9, which is outputted by using the TIMER port; and the external integral filter circuit (FIG. 9). Alternatively, any specific configurations using other methods may be adopted as long as the object of the present invention can be achieved.

Next, a description is made of microcomputer operations of setting the drive frequency, which is illustrated in Step #1 and after in FIG. 8(*a*). The drive frequency f is calculated in Step #9 to be described later. Before Step #9, the constants k, L1, and N are set in Step #2 in order to calculate the drive frequency f.

In Step #3, the target value Io*, which is stored in the steps (Steps S1 to S3) of storing the output current target value, is acquired.

In Step #4, an initial value of the frequency, which is to be used at the time when the drive of the DC-DC converter is started, is set at the drive frequency f. The operations thus far are implemented for processing performed before the circuit output operation is started.

In Step #5, it is confirmed whether or not the present state is a state where such a circuit operation is possible. Determination as to whether or not the circuit operation is possible is performed in a flow that is not illustrated here and is other than a flow for setting the drive frequency. However, specifically, the determination is made based on such information as to whether the value of the input voltage detection signal remains within a range where the operation is possible.

In the case where the present state is not the state where the circuit operation is possible as a result of the confirmation in Step #5, the operations proceed to Step #6, where the output of the reference oscillation signal is stopped (if the reference oscillation signal is not outputted yet, then that state is maintained). Then, the operations return to Step #5, and the confirmation of the present state is repeatedly performed.

In the case where the present state is the state where the circuit operation is possible as the result of the confirmation in Step #5, the operations proceed to Step #7, where the output of the reference oscillation signal is permitted (if the reference oscillation signal is already outputted, then that state is maintained). Then, the operations proceed to Step #8.

In Step #8, the output voltage detection signal Vout and the input voltage detection signal Vin are acquired as the values subjected to A/D conversion.

In Step #9, the drive frequency f is calculated by the following expression by using the respective values described above.

$$f = k/(2 \cdot L1 \cdot Io^* \cdot Vout) \cdot (Vin \cdot Vout/(N \cdot Vin + Vout))^2$$

In Step #10, a magnitude relationship is determined between the value of the frequency f, which is calculated in Step #9, and the present value of the frequency f. In the case where the calculated value is larger than the present value as a result of this determination, the operations proceed to Step #12, where the value of the frequency f is increased by a predetermined value. On the contrary, in the case where the calculated value is equal to or lower than the present value, the operations proceed to Step #11, where the value of the frequency f is decreased by a predetermined value.

Thereafter, the operations return to Step #5, and the above-described operations are repeated.

In such a way, in response to the value of the current target value Io* stored by the output current target value storage/adjustment unit 51, to the value of the present output voltage detection signal Vout, and to the value of the present input voltage detection signal Vin, the drive frequency setter 81 sequentially calculates and sets the value of the drive frequency f so that the DC-DC converter can operate in the current continuous mode.

The value set as the drive frequency f is given as the reference oscillation signal from the first TIMER port HF of the microcomputer 9 to the PWM signal generator 7, and as a result, the switching element Q1 of the DC-DC converter is driven at the calculated frequency f. In such a manner as described above, in this embodiment, the ON-timing of the switching element Q1 is regulated, thus making it possible to realize the operation in the current continuous mode.

Figure 6:
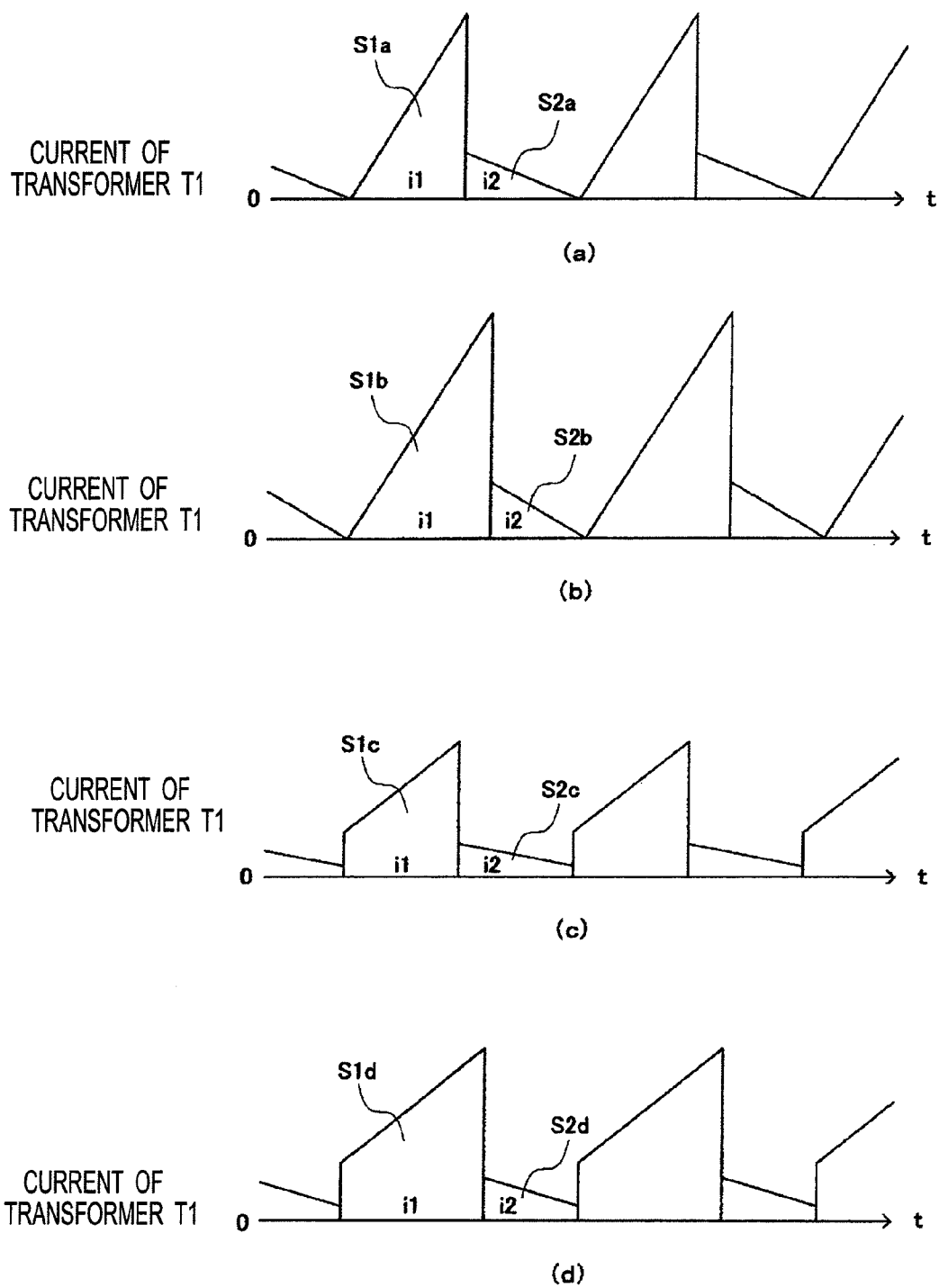
FIGS. 6(a) to 6(d) are operation waveform charts of Embodiment 3 of the present invention.
Figure 10:
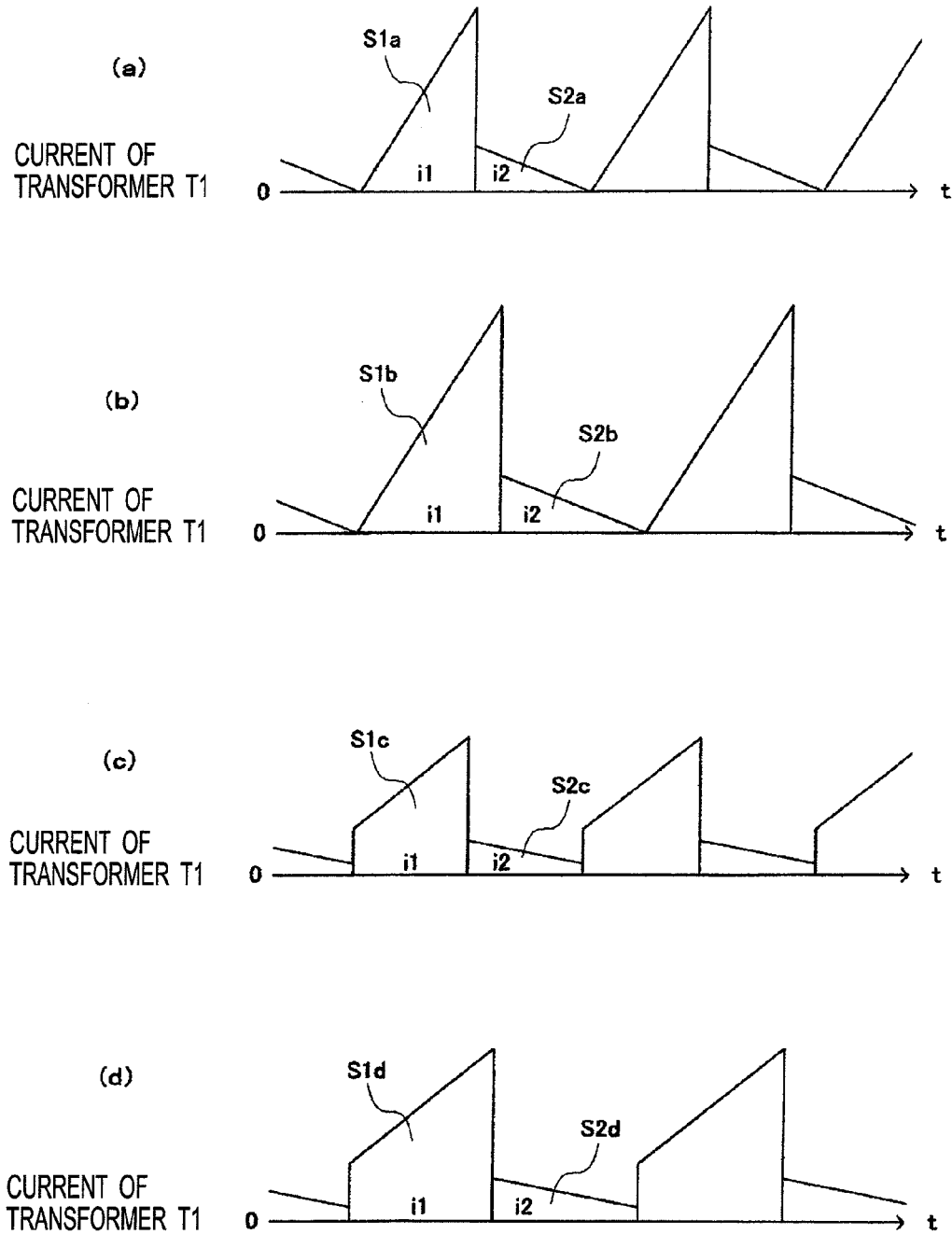
FIGS. 10(a) to 10(d) are operation waveform charts of Embodiment 4 of the present invention.

Next, in a similar way to FIGS. 6(*a*) to 6(*d*), comparison is illustrated in FIGS. 10 (*a*) to 10(*d*), which is made between operation waveforms when the DC-DC converter is operated while varying the output current target value by using this embodiment and operation waveforms in the case where the operations in the conventional boundary mode are assumed. The waveforms of FIGS. 10(*a*) and 10(*b*) are illustrated in order to be compared with the operation waveforms of FIGS. 10(*c*) and 10(*d*) according to the present invention, and to describe the effects of the present invention. The waveforms of FIGS. 10(*a*) and 10(*b*) are waveforms created by assuming the case where the flyback converter is operated in the current boundary mode. For example, it is assumed that the current flowing through the transformer T1 becomes as illustrated in FIG. 10(*a*) in the case where the target current is supplied to a certain LED load. Next, if the case where the value of the target current is increased by 1.25 times is assumed, then an operation waveform in this case becomes the waveform illustrated in FIG. 10(*b*). The output current is changed to 1.25 times for the same LED load, both of the output power and the input power become 1.25 times (note that, for the simplification, the description is made here on the assumption that no change occurs in the voltage value of the LED load owing to the increase of the current).

At this time, an area S1*b* of a waveform of a current i1 becomes 1.25×(ratio of cycles) times an area S1*a*, and an area S2*b* of a waveform of a current i2 becomes 1.25×(ratio of cycles) times an area S2*a*. By the way, values obtained by averaging the areas S2*a* and S2*b* by the switching cycle are an input current value and output current value of the waveform concerned, respectively. In the case where the output current is increased by 1.25 times as described above, peak values of the current i1 and the current i2 rise largely. In the actual circuit, this matter leads to the increase of the switching loss, and causes the increase of the ripple voltage and the increase of the ripple current.

FIGS. 10(c) and 10(d) illustrate the operation waveforms in the case of using the present invention. In order to compare these operation waveforms with the waveforms in FIGS. 10(a) and 10(b) in the above-mentioned case where the DC-DC converter is operated in the conventional boundary mode, here, there are illustrated waveforms in the case where the frequency is determined by the drive frequency setter 81 so that the switching frequencies of the respective waveforms can be the same thereamong (the inductance L1 and L2 in the waveforms of FIGS. 10(c) and 10(d) are made larger than those in the waveforms of FIGS. 10(a) and 10(b), and others including the turns ratio of the transformer T1 are made the same thereamong).

Here, a period while the switching element Q1 is turning on in one cycle (ON-duty) is determined by the input voltage Vi, the output voltage Vo, and the turns ratio N of the transformer. As a result, the ON-duties of the waveforms in FIGS. 10(c) and 10(d) become the same as those of the waveforms FIGS. 10(a) and 10(b), respectively. Moreover, areas S1c and S2c become the same as the areas S1a and S2a, respectively, and areas S1d and S2d become the same as the areas S1b and S2b, respectively. The waveforms in FIGS. 10(c) and 10(d) become waveforms in which there are base components in the currents i1 and i2 since the DC-DC converter is operated so that the current flowing through the transformer T1 can flow in the continuous mode by using the present invention.

When the waveforms in FIGS. 10(c) and 10(d) in the case where the DC-DC converter is allowed to operate according to the present invention are compared with the waveforms in FIGS. 10(a) and 10(b) in the case where the DC-DC converter is allowed to operate in the conventional boundary mode, it is confirmed that the following features and effects are brought according to the waveforms in FIGS. 10(c) and 10(d).

In both of the currents i1 and i2, the current peak values thereof are individually reduced in comparison with those in the conventional waveforms. The peak values are lower though the areas are the same as in the conventional waveforms, and accordingly, effective values of the respective waveforms are lowered. As a result, effects of reducing the ripple current and the ripple voltage are brought (the effect of reducing the ripples is brought not only for the output but also for the input). Moreover, also with regard to the efficiency of the DC-DC converter, as mentioned in Embodiment 3 of the present invention, when the waveforms in FIG. 10(a) and FIG. 10(c) are compared with each other, and the waveforms in FIG. 10(b) and FIG. 10(d) are compared with each other, it is conceived that the switching loss when the switching element Q1 turns on is increased more in the continuous mode operation. However, it is conceived that the switching loss when the switching element Q1 turns off, the loss when the switching element Q1 is in the ON-state, and the like are rather reduced more in the continuous mode operation. When this is actually confirmed by the actual device, it is confirmed that the loss in the whole of the DC-DC converter is reduced more and the conversion efficiency thereof is enhanced in the case where the DC-DC converter is allowed to perform the continuous mode operation.

As described above, in accordance with the present invention, the reference oscillation signal is determined by the drive frequency setter 81 so that the current flowing through the transformer T1 of the DC-DC converter can flow in the continuous mode. In such a way, it becomes possible to provide the power supply device, which has high efficiency, in which the current to be supplied to the load 2 has a small ripple, and eventually, the noise occurring by the ripple component is also small, even in the case where the value of the output current Io to be supplied to the semiconductor light source load 2 is changed.

Moreover, in accordance with this embodiment, the configuration is adopted, in which it is possible to set (possible to vary) the target value Io* of the output current Io from the outside. Accordingly, it becomes possible to provide the power supply device capable of coping with more various LED loads. Furthermore, in accordance with the above-described microcomputer operations, the values of the drive frequencies to be set are sequentially changed. Accordingly, there is such an advantage that the noise can be reduced far more effectively since a frequency spectrum of the noise occurring by the switching operation is dispersed.

Embodiment 5

Figure 11:
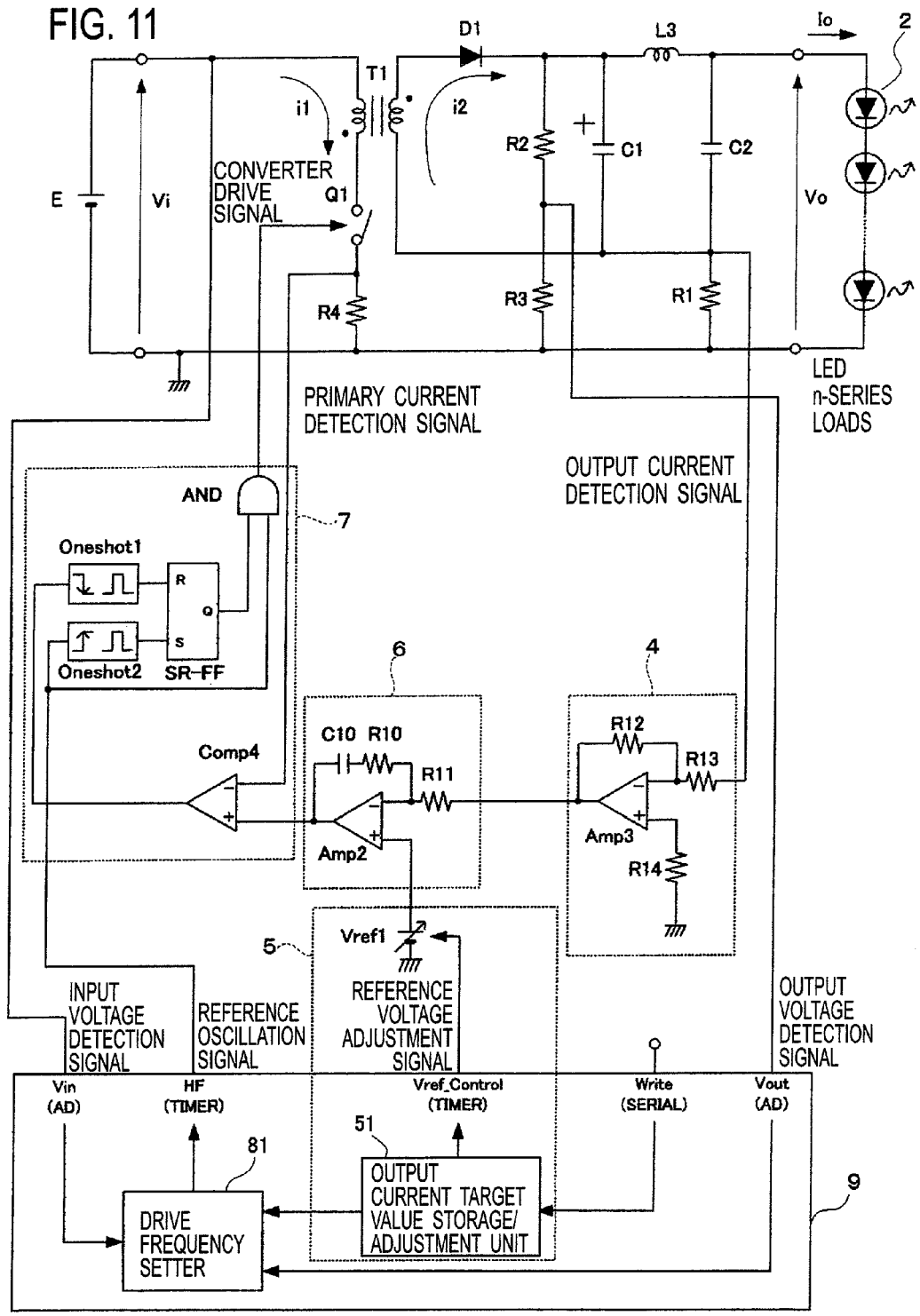
FIG. 11 is a circuit diagram of Embodiment 5 of the present invention.

A circuit diagram of Embodiment 5 of the present invention is illustrated in FIG. 11. This embodiment is different from the above-mentioned embodiments in that a filter composed of an inductance L3 and a capacitor C2 is provided on the secondary side of the DC-DC converter, that a configuration is adopted so that PWM control by a current mode can be performed by providing a resistor R4 for detecting the current i1 on the primary side of the DC-DC converter, and the like. In accordance with this control method, there is an effect of reducing the output ripple, and moreover, the ripple of the output current Io can be further reduced by providing the filter on the secondary side.

Moreover, with regard to the control in the current mode, ON/OFF control for the switching element Q1 is achieved by the following operations. The current flowing through the load 2 is detected as the output current detection signal by the current detection resistor R1, and this signal is amplified by the signal amplifier 4. Thereafter, the amplified signal is compared with the reference voltage Vref1 by the error calculator 6, and a result thereof is inputted as the PWM command signal to the PWM signal generator 7. A predetermined PWM signal is generated by the PWM signal generator 7, and the PWM signal is supplied as the ON/OFF control signal (converter drive signal) to the switching element Q1. In such a way, a feedback control system is composed so as to adjust the output current.

In this embodiment, the signal amplifier 4 is formed as the inverting amplifier composed of: the operational amplifier Amp3; and the resistors R21, R13 and R14 which are placed on the periphery thereof. The error calculator 6 is formed as the proportional-integrator composed of: the operational amplifier Amp2; and the resistors R10 and R11 and the capacitor C10, which are placed on the periphery thereof.

From the TIMER port. HF of the microcomputer 9, the reference oscillation signal for driving the DC-DC converter is given, and in response to a rise of the reference oscillation signal, a one-shot circuit Oneshot2 gives a pulse signal for setting to a set terminal S of the set-reset flip-flop SR-FF. By this pulse signal, an output Q of the set-reset flip-flop SR-FF turns to the high level, and the switching element Q1 is driven to turn on. In such a way, the timing of turning on the switching element Q1 can be regulated by the drive frequency setter 81.

The comparator Comp4 compares the output, which comes from the error calculator 6, with a value (primary current detection signal) as an instantaneous value of the current i1 flowing through the primary side of the transformer T1, the instantaneous value being detected by the voltage generated in the resistor R4. Then, the comparator Comp4 gives a result of the comparison to a one-shot circuit Oneshot1. In response to a fall as the result of the comparison, the one-shot circuit Oneshot1 gives a pulse signal for resetting to a reset terminal R of the set-reset flip-flop SR-FF. By this pulse signal, the output Q of the set-reset flip-flop SR-FF turns to the Low level, and the switching element Q1 is driven to turn off.

Note that a signal input from the TIMER port HF of the microcomputer 9 to a logic gate AND is performed for regulating the maximum ON-time (minimum OFF-time). When the reference oscillation signal turns to the Low level, the switching element Q1 turns off irrespective of the output Q of the set-reset flip-flop SR-FF. In such a manner as described above, the current mode control is realized in this embodiment.

Incidentally, the microcomputer 9 reads in the voltage, which is obtained by dividing the output voltage Vo of the DC-DC converter by the resistor R2 and the resistor R3, as the output voltage detection signal Vout from the A/D conversion port. Moreover, the microcomputer 9 reads in the input voltage Vi as the input voltage detection signal Vin from the A/D conversion port in the same way. Furthermore, the target value Io* of the output current Io, which is given by the communication means from Write of the serial communication port, is stored by the output current target value storage/adjustment unit 51. The output current target value storage/adjustment unit 51 outputs the reference voltage adjustment signal Vref_Control from the second TIMER port so that the reference voltage Vref1 of the error calculator 6 can become the value corresponding to the target current value, and gives the target value of the output current to the drive frequency setter 81 composed of software.

The drive frequency setter 81 sends out the reference oscillation signal HF from the first TIMER port to the PWM signal generator 7 based on the input voltage detection signal, the output voltage detection signal, and the target value of the output current.

The operations of the microcomputer 9 are basically the same as those of Embodiment 4 (as illustrated in FIG. 8).

Also in this embodiment, the reference oscillation signal is determined by the drive frequency setter 81 so that the current flowing through the transformer T1 of the DC-DC converter can flow in the continuous mode. In such a way, as in the above-mentioned embodiments, it becomes possible to provide the power supply device, which is capable of coping with the variously set semiconductor light source loads 2, and has high efficiency, in which the current to be supplied to each of the loads 2 has a small ripple, and eventually, the noise occurring by the ripple component is also small.

Moreover, in this embodiment, a configuration is adopted so that the PWM control can be performed by control according to the current mode (control method for equalizing the peak value of the current i1 flowing on the primary side and the command value from the error calculator 6 to each other). Therefore, for example, even in the case where the power source E fluctuates unexpectedly and suddenly, the current i1 is restricted appropriately. Therefore, such a situation is suppressed, where the current i1 instantaneously becomes too large, and following this, the current i2 also becomes too large. As a result, it becomes possible to provide a power supply device that is capable of stably controlling the output, in other words, in which the ripple is small.

Incidentally, in the case where the DC-DC converter is controlled by the current mode, then sometimes, stability points of the operations do not converge to one point, and there occurs such an unstable state that a switching frequency causes a skip (that is, a so-called frequency-halving phenomenon). In such a case, in the circuit of FIG. 11, a signal that has a predetermined gradient and is synchronized with the switching frequency is superimposed on the primary current detection signal, and a signal thus obtained by the superimposition is inputted to the comparator Comp4, and so on. In such a way, the DC-DC converter can be stably operated.

Embodiment 6

Figure 12:
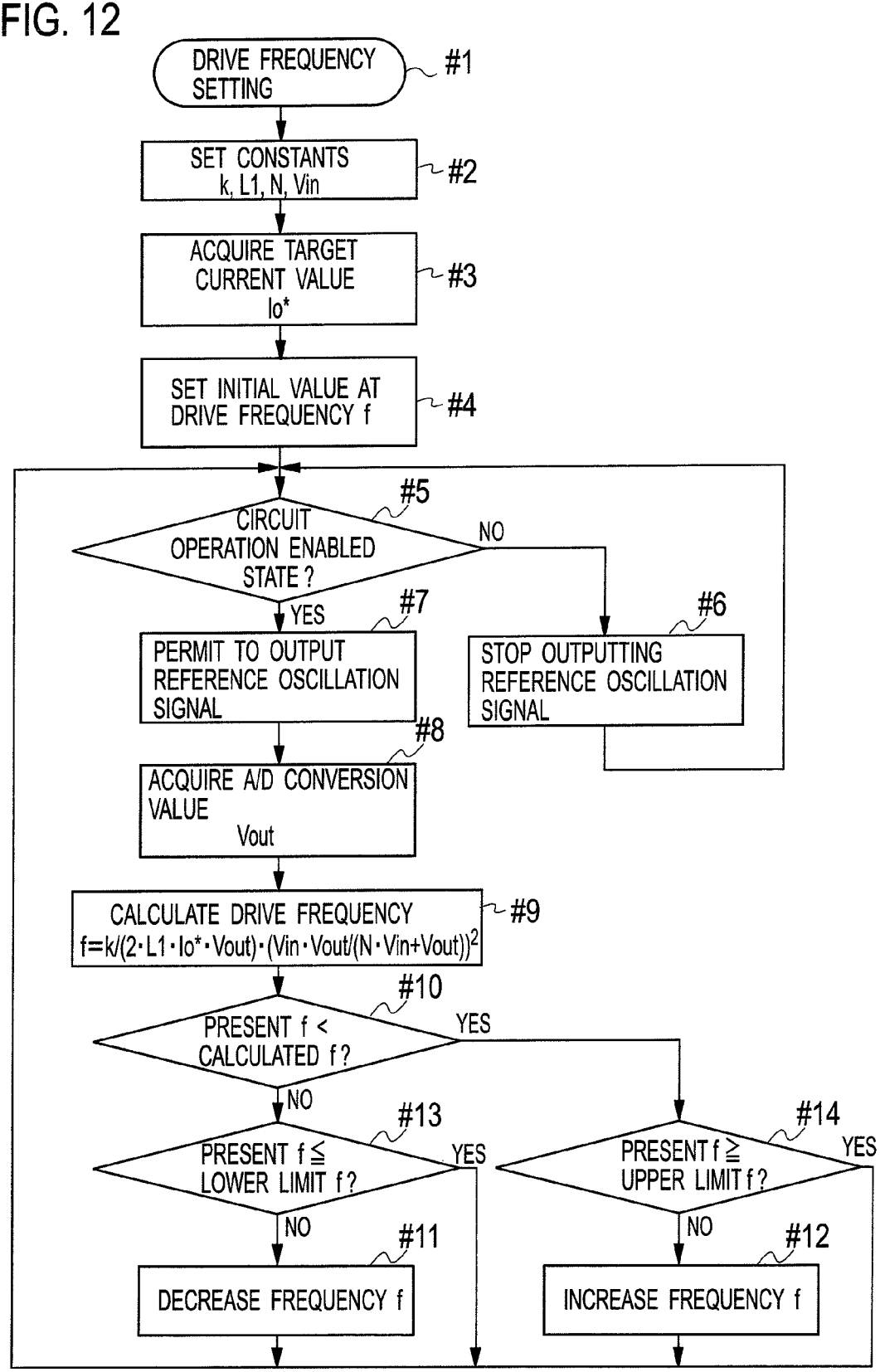
FIG. 12 is an operation explanatory chart of a microcomputer of Embodiment 6 of the present invention.

An operation explanatory chart of a microcomputer 9 of Embodiment 6 of the present invention is illustrated in FIG. 12. Moreover, operation waveform charts for explaining the operations of this embodiment are illustrated in FIGS. 13(a) and 13(b). This embodiment is different from the above-mentioned Embodiments 4 and 5 in the following points.

The different points are as follows. First, in such a flow for the microcomputer in FIG. 12, the value of the input voltage Vin is set as a constant in Step #2, and only the output voltage Vout is acquired in Step #8 of acquiring the A/D conversion value. Moreover, Step #13 and Step #14 are added, and it is confirmed whether or not the present drive frequency f reaches preset lower limit and upper limit values of the drive frequency. Then, in the case where the present drive frequency f reaches the respective lower limit and upper limit values, the value of the frequency is not decreased more than the lower limit value or increased more than the upper limit value.

As described above, in this embodiment, a configuration is adopted, in which the drive frequency is calculated not by reading in the actual value as the value of the input voltage Vin, but by using the value of the input voltage Vin, which is preset as the constant. Here, the value of the input voltage Vin, which is set as the constant, is set at the highest value assumed among a voltage range where the power supply device is usually used.

In the case where the output voltage and the output current are assumed to be constant, the drive frequency required for achieving the current continuous mode operation tends to rise as the input voltage is higher. Therefore, the highest value of the input voltage among the input voltages assumed in advance is prepared to be used as the value of the input voltage Vin. In such a way, in the case where the DC-DC converter is driven at the frequency f obtained based on the value concerned, the DC-DC converter operates in the continuous mode without fail.

In such a way, in this embodiment, the value to be read in as the A/D conversion value every time when the drive frequency f is calculated is saved to one, which is the output voltage Vout. Therefore, the respective pieces of processing in the microcomputer, which are the reading processing and the calculation (arithmetic operation) processing, become simple, whereby there is such an advantage that a more inexpensive microcomputer can be used.

Moreover, it is only the output voltage Vout that is a parameter to be changed every time when the drive frequency is calculated. Accordingly, it also becomes possible to reduce loads of the processing by simplifying the arithmetic operation performed in Step #9. For example, relationships between the output voltage Vout and (f/Io*) are stored in advance as table data in the microcomputer in an approximation manner. In the processing to be performed every time, a value of (f/Io*), which corresponds to the value of the output voltage Vout, is read out from the table data concerned. Here, the value of the output voltage Vout is obtained by acquiring the A/D conversion value. Then, the value thus read out is multiplied by the value of Io*, whereby the value of the drive frequency f is obtained. In such a way, the calculation is simplified, and therefore, it becomes possible to further reduce the loads on the microcomputer.

Next, Step #13 and Step #14 are added, and it is confirmed whether or not the present drive frequency f reaches the preset lower limit and upper limit values of the drive frequency. Then, in the case where the present drive frequency f reaches the respective lower limit and upper limit values, the value of the frequency is not decreased more than the lower limit value or increased more than the upper limit value. A description is made of this point.

In Step #13, it is determined whether or not the present drive frequency is equal to or lower than the preset lower limit value of the drive frequency. In the case where the present drive frequency is not equal to or lower than the lower limit value, the operations proceed to Step #11, where the value of the drive frequency f is decreased by a predetermined value. In the case where the present drive frequency is equal to or lower than the lower limit value, Step #11 is skipped, whereby processing is performed so as not to decrease the value of the drive frequency f any more.

In Step #14, it is determined whether or not the present drive frequency is equal to or higher than the preset upper limit value of the drive frequency. In the case where the present drive frequency is not equal to or higher than the upper limit value, the operations proceed to Step #12, where the value of the drive frequency f is increased by a predetermined value. In the case where the present drive frequency is equal to or higher than the upper limit value, Step #12 is skipped, whereby processing is performed so as not to increase the value of the drive frequency f any more.

For example, it is assumed that the DC-DC converter operates on a waveform illustrated in FIG. 13(a) when a certain load is connected thereto. Moreover, it is assumed that the drive frequency substantially reaches the preset lower limit value of the frequency. At this time, the case is considered, where the DC-DC converter is operated while increasing the target value of the output current. The lower limit of the frequency is provided, whereby the frequency ceases to be lowered any more, and the waveform becomes as illustrated in FIG. 13(b) in order to output the output current as the target. Specifically, in comparison with the waveform in FIG. 13(a), the base component of the current is increased while the frequency is being kept substantially unchanged, whereby the power supply device becomes capable of coping with the load.

By the way, a waveform drawn by broken lines in FIG. 13(b) is a waveform in the case where no limits are given to the frequency. As described above, even in the case where the limits are given to the frequency in the continuous mode operation, it is possible to perform the output operation corresponding to the load.

In this embodiment, the value of the frequency of driving the switching element Q1 can be allowed to remain within a predetermined range by the preset lower limit and upper limit values of the frequency. Specifically, the limits can be given to the drive frequency. Therefore, it becomes possible to provide a power supply device capable of coping with loads having wider characteristic ranges. This matter is applicable to all of the embodiments.

Moreover, if there are such problems that, for example, it becomes difficult to design the noise filter when the frequency is changed too much, and that the size of the filter is enlarged when the frequency is lowered, then it becomes possible to solve these problems by using this embodiment.

Embodiment 7

Figure 14:
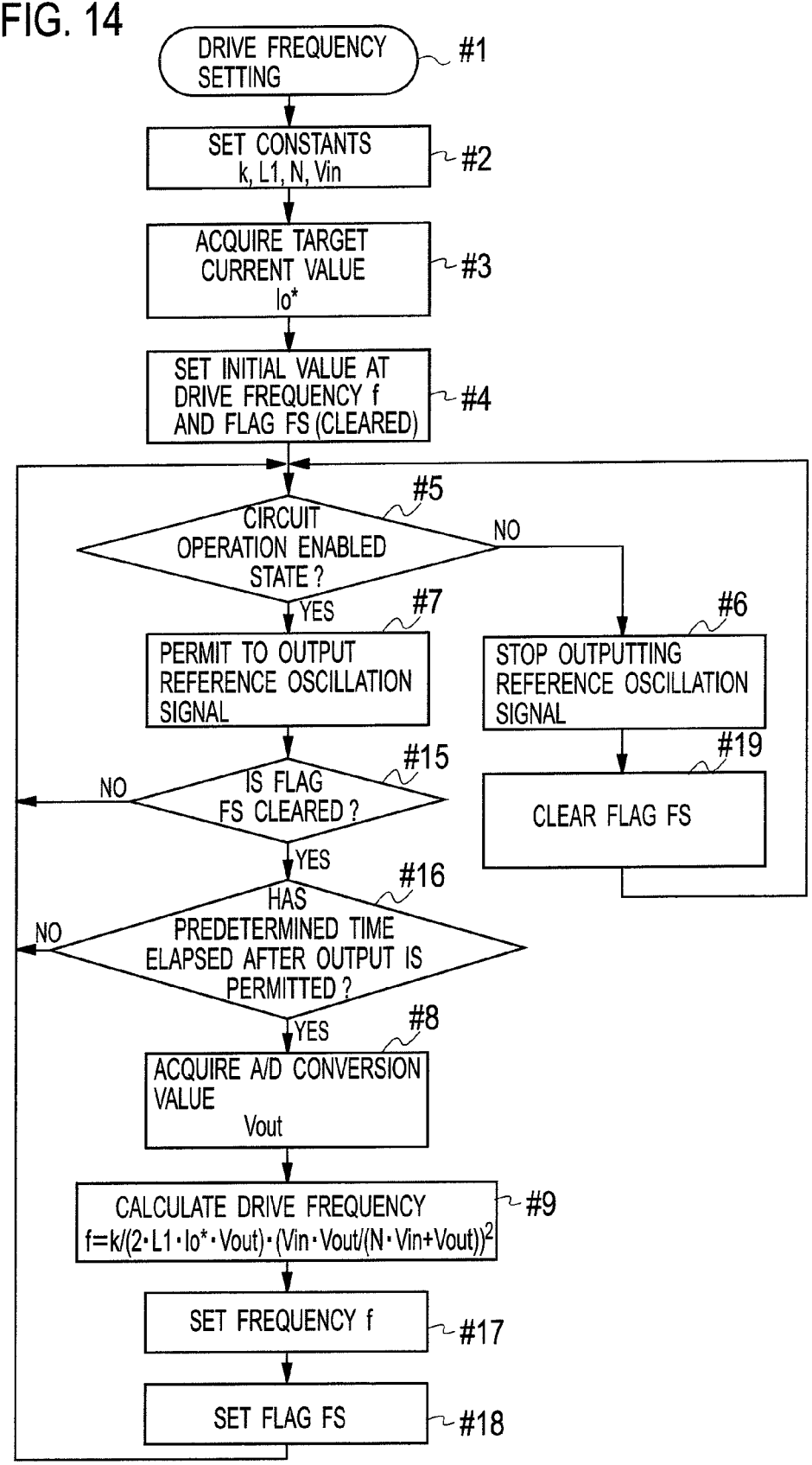
FIG. 14 is an operation explanatory chart of a microcomputer of Embodiment 7 of the present invention.

An operation explanatory chart of a microcomputer of Embodiment 7 of the present invention is illustrated in FIG. 14. In this embodiment, the circuit with the configuration illustrated in FIG. 11 is operated by using a flow illustrated in FIG. 14 in place of the flow of setting the drive frequency in the above-mentioned embodiment. In the case of operating the circuit according to this flow, determination work for the drive frequency is performed only once at the point of time when a predetermined time has elapsed after the start of the circuit operations. Thereafter, the circuit is driven at the determined frequency during a period until the stop of the circuit operations.

A description is made below in detail of the above-described operations while following the flow of FIG. 14. In this embodiment, a flag FS is newly provided. Depending on a state of the flag FS, it is determined whether or not the present state is a state where the drive frequency is to be determined. In response to a result of the determination, the determination work for the frequency is performed only once after the start of the circuit operations.

Specifically, a procedure of the operations is as follows. In the initial value setting in Step #4, the flag FS is cleared. Thereafter, the state of the flag FS is confirmed in Step #15. When the flag FS is cleared, the operations proceed to Step #16. In Step #16, it is determined whether or not a predetermined time set in advance has elapsed after permission of the output of the reference oscillation signal in Step #7. In the case where the predetermined time has not elapsed, the operations return to Step #5, where confirmation work for the elapsed time is performed continuously. Then, after the predetermined time has elapsed, the operations proceed to Step #8.

In Step #8, the A/D conversion value of the output voltage detection signal Vout is acquired, and in Step #9, the frequency f is determined. Thereafter, the frequency f determined in Step #17 is set as the drive frequency. Subsequently in Step #18, the flag FS is set, and is returned to Step #5. Thereafter, the flag FS is in a state of being set while the circuit operations are being performed, and accordingly, the determination result in Step #15 always becomes NO. In such a way, the operations are not allowed to proceed to Step #16 and after.

In the case where it is determined in Step #5 that the circuit is not in such an operation enabled state, the operations proceed to Step #6, where the output of the reference oscillation signal is stopped. Moreover, subsequently to Step #6, the flag FS is cleared in Step #19. In such a way, it is determined one more time in Step #5 that the circuit operations are enabled, and at the time when the operations are started, the determination of the frequency is performed only once after the elapse of the predetermined time in the same way as mentioned above.

In such a way, in this embodiment, the determination of the drive frequency f is performed only once after the start of the circuit operations. Therefore, it becomes unnecessary to periodically perform the work for determining the drive frequency f by the microcomputer. This matter leads to the load reduction of the microcomputer, and accordingly, there is such an advantage that a more inexpensive microcomputer can be used. Moreover, timing of determining the drive frequency is set at a point after the elapse of the predetermined time after the start of the operations, thus making it possible to determine the frequency without fail after the output is stabilized.

Moreover, in the above-mentioned respective embodiments, which are Embodiment 3 through Embodiment 7, at least the A/D conversion value of the output voltage detection signal is acquired, whereby the drive frequency f is determined. However, in such a case where the range of the assumed load is limited to some extent, value of the frequency, which is required at the time concerned, is obtained by using the value of the output voltage detection signal Vout in the case where the frequency becomes the highest within the range of the load. The value of the frequency is preset, thus also making it possible to adopt a configuration so that the expected effects can be obtained. In such a manner as described above, it becomes possible to obtain the effects of the present invention by a more simple controller.

For example, a case is considered, where the inductance value L1 on the primary side of the transformer T1 is 3.0 μH, the turns ratio N between the primary side and the secondary side is 5, and the input voltage Vin changes within a range from 10 to 16 V. It is assumed that the voltage of each of the connected various loads (that is, the output voltage detection signal) remains within a range from 23 to 46 V, and that the current of the load (that is, the output target current value Io*) is set at a value within a range from 0.75 to 1.0 A. In this case, from the above-mentioned calculation expression, it is understood that a value at least larger than 174 kHz just needs to be preset as the frequency f.

Moreover, in the case where the values of the output currents of the respective assumed loads are the same thereamong, the target value Io* of the output current may be stored by being written in the microcomputer in advance, and so on. This matter is applicable to all of the embodiments, and in such a manner as described above, it becomes possible to obtain the expected effects of the preset invention by a more simple controller.

Note that the respective embodiments are shown as examples, and for example, the embodiments realized by the microcomputers may also be configured so that similar operations can be obtained by individual electronic circuits. Moreover, the configurations of the DC-DC converter and the controller are not limited to the configurations illustrated in the respective embodiments. For example, the proportional-integrator is illustrated as the error calculator 6; however, the error calculator 6 may be composed of other proportional circuits. Moreover, the operation flow of the microcomputer is not limited to those illustrated, and just needs to have a configuration in which similar operations can be obtained.

Embodiment 8

Figure 15:
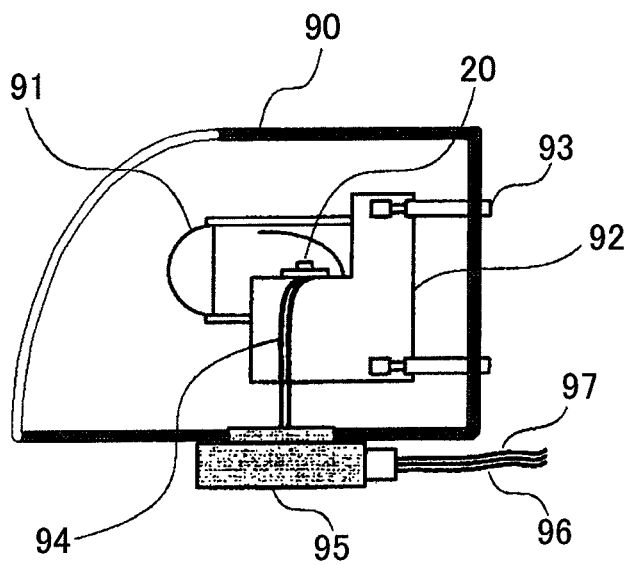
FIG. 15 is a cross-sectional view of a lamp fitting of Embodiment 8 of the present invention.

A cross-sectional view of a lamp fitting of Embodiment 8 of the present invention is illustrated in FIG. 15. The illustrated lamp fitting illustrates an outline of a configuration of a headlamp 90 for a vehicle. A power supply device 95 that has the above-mentioned configuration and is covered with a metal package is attached and mounted on a lower surface portion of a headlamp package. An LED module 20 composed of a plurality of LED elements is attached onto a heat radiation plate 92, and the LED module 20 and the heat radiation plate 92 compose a light source unit together with an optical unit 91 composed of al lens and a reflection plate. The light source unit is fixed to the package of the headlamp 90 by a light source unit fixing jig 93. A power supply line 96 of an input of the power supply device 95 is connected a battery (not illustrated), and a communication line 97 thereof is connected to a vehicle-side unit (not illustrated). The communication line 97 is provided in order to issue a notice of abnormality to the vehicle side in the case where the abnormality occurs on the load, and for example, a configuration may be adopted so that the target value of the output current can be transmitted from the outside to the power supply device 95 by using this communication line 97 (for example, by performing communication by using local interconnect network (LIN)). An output line 94 of the power supply device 95 is connected to the LED module 20.

In accordance with the present invention, it becomes possible to provide a lamp fitting composed by including the power supply device that is capable of coping with the variously set semiconductor light source loads, and has high efficiency, in which the current to be supplied to each of the loads has a small ripple. In such a way, it becomes unnecessary to prepare the power supply devices individually in response to the variously set loads, and hence, it becomes possible to set various loads in response to design of the lamp fitting, and it becomes possible to enhance a function as the lamp fitting, to enhance the design thereof, and so on. Moreover, it is possible to cope with the various loads by the same power supply device, and accordingly, it becomes resultantly possible to provide an inexpensive lamp fitting. Moreover, a lamp fitting that has high efficiency and consumes less energy can be provided, and further, the current ripple can be suppressed to be low, and accordingly, it becomes possible to provide a lamp fitting having good noise performance.

Embodiment 9

Figure 16:
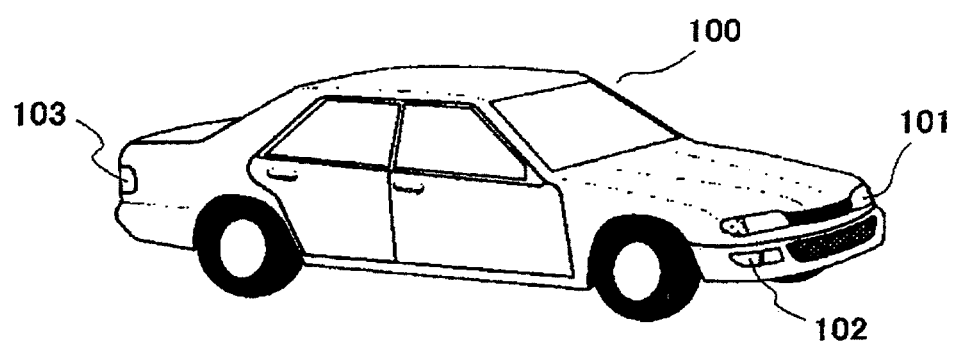
FIG. 16 is a perspective view of a vehicle of Embodiment 9 of the present invention.

A perspective view of a vehicle of Embodiment 9 of the present invention is illustrated in FIG. 16. This embodiment shows an example of using the above-mentioned lamp fitting as each of headlamps 101 of a vehicle 100. The above-mentioned lamp fitting is mounted, thus making it possible to prove a vehicle more excellent in safety, design, environmental performance and comfort.

Moreover, though the case is shown here, where the power supply device of the present invention is used for the headlamp 101 of the vehicle 100, similar effects can be obtained even in the case of applying the power supply device to other lamps, which are direction indicators 102, tail lamps 103 and the like.

INDUSTRIAL APPLICABILITY

The power supply device of the present invention and the lamp fitting using the power supply device concerned are usable not only for the vehicle but also as various lamp fittings.

REFERENCE SIGNS LIST

T1 Transformer
Q1 Switching element
1 DC-DC converter
2 Load
3 Output current detector
4 Signal amplifier
5 Output current target value setter
6 Error calculator
7 PWM signal generator
8 On-timing regulator

The invention claimed is:
1. A power supply device that supplies power to a semiconductor light source load and lights the semiconductor light source load, comprising:
a DC-DC converter
that includes an inductance element and a switching element,
and performs voltage conversion by storing energy in the inductance element from an input power source when the switching element is on, and discharging the energy, the energy being stored in the inductance element, to a load side when the switching element is off; and a controller that controls ON/OFF operations of the switching element so that an output current of the DC-DC converter can be the same as a target value, wherein a timing regulator that regulates timing of turning on the switching element is provided at least in the controller so that a current flowing through the inductance element can flow in a continuous mode operation, wherein the timing regulator is composed so as to detect a current flowing when the energy is discharged from the inductance element to the load side when the switching element is off, and to turn on the switching element when a value of the detected current becomes equal to or lower than a predetermined value, and wherein a time while the switching element is off is controlled to continue for at least a first predetermined minimum time, and to not continue beyond a second predetermined maximum time that is higher than the first predetermined minimum time.

2. The power supply device according to claim 1, wherein the DC-DC converter is composed of a flyback converter.

3. The power supply device according to claim 1, wherein a configuration is adopted so that the target value of the output current can be set from outside of the power supply device.

4. The power supply device according to claim 1, wherein a value preset in the power supply device is used as the target value of the output current.

5. A lamp fitting comprising the power supply device according to claim 1, wherein the power supply device is mounted on the lamp fitting.

6. A vehicle comprising the lamp fitting according to claim 5, wherein the lamp fitting is mounted on the vehicle.

7. A power supply device that supplies power to a semiconductor light source load and lights the semiconductor light source load, comprising:

a DC-DC converter
that includes an inductance element and a switching element,
and performs voltage conversion by storing in the inductance element from an input power source when the switching element is on, and discharging the energy, the energy being stored in the inductance element, to a load side when the switching element is off; and a controller that controls ON/OFF operations of the switching element so that an output current of the DC-DC converter can be the same as a target value, wherein a timing regulator that regulates timing of turning on the switching element is provided at least in the controller so that a current flowing through the inductance element can flow in a continuous mode operation, and wherein the timing regulator is formed by determining a frequency for driving the switching element multiple times in a cycle.

8. The power supply device according to claim 7, wherein the frequency for driving the switching element is determined based on at least a value of the output current of the DC-DC converter.

9. The power supply device according to claim 7, wherein the DC-DC converter is composed of a flyback converter, and when an input voltage is Vi, the output voltage is Vo, the target value of the output current is Io, a turns ratio between a primary side and secondary side of a transformer that composes the flyback converter is N, an inductance value on the primary side is L1, and the frequency for driving the switching element is f, the controller determines the frequency for driving the switching element so as to satisfy a condition that is: $f > 1/(2 \cdot L1 \cdot Io \cdot Vo) \cdot (Vi \cdot Vo/(N \cdot Vi + Vo))^2$.

10. The power supply device according to claim 9, wherein the controller determines the frequency for driving the switching element so as to satisfy a condition that is: $f \geq k/(2 \cdot L1 \cdot Io \cdot Vo) \cdot (Vi \cdot Vo/(N \cdot Vi + Vo))^2$ in a case where a constant is k, and a value of the constant k is at least 1.05 or more.

11. The power supply device according to claim 7, wherein the frequency for driving the switching element is determined by assuming a case where a voltage value is the highest within a voltage range where the input power source of the DC-DC converter is usually used.

12. The power supply device according to claim 7, wherein a value of the frequency for driving the switching element is controlled to be at least a first predetermined frequency or higher, and to be a second predetermined frequency or lower.

13. The power supply device according to claim 7, wherein a value set when a circuit operation is started is used as the frequency for driving the switching element for a period until the circuit operation is stopped.

14. The power supply device according to claim 7, wherein a value preset in the power supply device is used as the frequency for driving the switching element.

* * * * *